(12) United States Patent
Stephens

(10) Patent No.: US 10,382,450 B2
(45) Date of Patent: Aug. 13, 2019

(54) NETWORK DATA OBFUSCATION

(71) Applicant: Sanctum Solutions Inc., Houston, TX (US)

(72) Inventor: Noel Shepard Stephens, Spring, TX (US)

(73) Assignee: Sanctum Solutions Inc., Houston, TX (US)

( * ) Notice: Subject to any disclaimer, the term of this patent is extended or adjusted under 35 U.S.C. 154(b) by 348 days.

(21) Appl. No.: 15/438,176

(22) Filed: Feb. 21, 2017

(65) Prior Publication Data

US 2018/0241760 A1    Aug. 23, 2018

(51) Int. Cl.
*H04L 29/06* (2006.01)

(52) U.S. Cl.
CPC ........ *H04L 63/123* (2013.01); *H04L 63/0281* (2013.01); *H04L 63/0428* (2013.01); *H04L 63/0876* (2013.01); *H04L 63/0861* (2013.01)

(58) Field of Classification Search
CPC ............... H04L 63/123; H04L 63/0281; H04L 63/0428; H04L 63/0876; H04L 63/0861
See application file for complete search history.

(56) References Cited

U.S. PATENT DOCUMENTS 6,338,139 B1 * 1/2002 Ando ............... G11B 20/00086
                                                          380/28
6,668,325 B1 * 12/2003 Collberg ................. G06F 21/14
                                                          713/194

(Continued)

FOREIGN PATENT DOCUMENTS

CN    101867530 A    10/2010
CN    103647762 A     3/2014
(Continued)

OTHER PUBLICATIONS

Polychronakis, Michalis, Panayiotis Mavrommatis, and Niels Provos. "Ghost turns zombie: exploring the life cycle of web-based malware." (2008). (Year: 2008).*

(Continued)

*Primary Examiner* — Robert B Leung
*Assistant Examiner* — Sameera Wickramasuriya
(74) *Attorney, Agent, or Firm* — The Petruzzi Law Firm; James D. Petruzzi

(57) ABSTRACT

Network data obfuscation is disclosed. For example, an obfuscation driver is initialized in an endpoint device connected to an obfuscation gateway over a secure connection by collaboratively generating a unique machine identifier of the endpoint device. An obfuscated communication session is established between the obfuscation driver and the obfuscation gateway. Obfuscated messages including obfuscation seeds, de-obfuscation instructions and message payloads are exchanged between the obfuscation driver and the obfuscation gateway. Obfuscating and de-obfuscating a given message includes reordering a plurality of message segments of the message based on the de-obfuscation instructions. A de-obfuscated message from the obfuscation driver is forwarded to an application, and a response is obfuscated by the obfuscation gateway before being transmitted to the obfuscation driver. An obfuscation seed exchange occurs between the obfuscation gateway and the obfuscation driver while the application is processing the de-obfuscated message.

49 Claims, 16 Drawing Sheets

(56) References Cited

U.S. PATENT DOCUMENTS

| | | | |
|---|---|---|---|
| 7,343,619 B2* | 3/2008 | Ofek | H04L 47/10 |
| | | | 709/225 |
| 7,724,918 B2 | 5/2010 | Balakrishnan et al. | |
| 8,434,139 B1* | 4/2013 | Ortiz, Jr. | H04L 63/029 |
| | | | 709/227 |
| 8,509,753 B2* | 8/2013 | Chandra | H04W 4/023 |
| | | | 455/414.3 |
| 9,021,602 B2 | 4/2015 | Moskowitz | |
| 9,495,544 B2* | 11/2016 | Aissi | G06F 21/60 |
| 9,503,189 B2 | 11/2016 | Henry et al. | |
| 9,509,507 B1 | 11/2016 | Hunt et al. | |
| 9,641,434 B1* | 5/2017 | Laurence | H04L 45/7453 |
| 2005/0213737 A1 | 9/2005 | Rodman et al. | |
| 2005/0251865 A1 | 11/2005 | Mont et al. | |
| 2007/0261112 A1* | 11/2007 | Todd | G06F 21/577 |
| | | | 726/11 |
| 2008/0016230 A1 | 1/2008 | Holtmanns et al. | |
| 2008/0275829 A1 | 11/2008 | Stull et al. | |
| 2009/0132419 A1 | 5/2009 | Grammer et al. | |
| 2010/0142410 A1 | 6/2010 | Huynh Van et al. | |
| 2010/0257354 A1 | 10/2010 | Johnston et al. | |
| 2012/0079282 A1* | 3/2012 | Lowenstein | G06F 21/82 |
| | | | 713/189 |
| 2012/0278897 A1* | 11/2012 | Ang | H04L 61/2596 |
| | | | 726/26 |
| 2013/0046983 A1 | 2/2013 | Zhu et al. | |
| 2014/0053244 A1* | 2/2014 | Raman | G06F 21/6263 |
| | | | 726/4 |
| 2014/0115715 A1* | 4/2014 | Pasdar | G06F 21/6245 |
| | | | 726/26 |
| 2014/0289833 A1* | 9/2014 | Briceno | H04L 63/08 |
| | | | 726/7 |
| 2015/0143118 A1 | 5/2015 | Sheller et al. | |
| 2015/0382190 A1 | 12/2015 | Canoy et al. | |
| 2017/0171170 A1* | 6/2017 | Sun | H04L 63/08 |
| | | | 726/7 |
| 2017/0180314 A1* | 6/2017 | Walker | G06F 21/6263 |
| | | | 726/4 |
| 2017/0180341 A1* | 6/2017 | Walker | G06F 21/14 |
| 2017/0351847 A1* | 12/2017 | Zvenigorodsky | G06F 21/14 |
| 2019/0007756 A1* | 1/2019 | Navali | G06F 21/577 |
| | | | 726/11 |

FOREIGN PATENT DOCUMENTS

| | | |
|---|---|---|
| WO | 2009/105280 A2 | 8/2009 |
| WO | 2016/003525 A2 | 1/2016 |
| WO | 2016/148773 A1 | 9/2016 |
| WO | 2016/177934 A1 | 11/2016 |
| WO | 2016/182749 A1 | 11/2016 |

OTHER PUBLICATIONS

M. Gruber et al., "Global VoIP security threats—large scale validation based on independent honeynets," 2015 IFIP Networking Conference (IFIP Networking), Toulouse, 2015, pp. 1-9. (Year: 2015).*

* cited by examiner

NETWORK DATA OBFUSCATION

BACKGROUND

The present disclosure generally relates to data transmission security in secured networks and over unsecured networks. Productivity gains related with the adoption of computing, tend to increase as various interrelated systems are more closely integrated. As computing has become more distributed, so have vulnerabilities in the transport layer between computer systems become more prevalent and more potentially damaging. Encryption has long been used to combat potential malicious acts and abuses such as possible security breaches, but with each generation of encryption, novel methods of attack have generally been devised. Among the targets of attacks are encryption mainstays such as session keys and a trust structure centered around certificate authorities. Computing tasks on devices large and small increasingly leverage cloud based solutions for scalability. As a result of this trend, sensitive data may pass through unsecured network segments, such as the internet, and data security becomes an issue of paramount importance in allowing devices to further leverage the efficiencies possible through cloud based, virtualized hosting solutions.

SUMMARY

The present disclosure provides a new and innovative system, methods and apparatus for network data obfuscation. In an example, an obfuscation driver in an endpoint device connected to a network is initialized. The obfuscation driver is in either an uninitialized state or an initialized state which has an active mode and a passive mode. The obfuscation driver operates in the active mode while the endpoint device is connected to a obfuscation gateway with a secure connection. Initializing the obfuscation driver includes collaboratively generating a unique machine identifier of the endpoint device by the obfuscation driver and the obfuscation gateway over the secure connection. An obfuscated communication session is established between the obfuscation driver operating in the active mode and the obfuscation gateway. Then, the obfuscation gateway receives from the obfuscation driver, a first obfuscated message of the obfuscated communication session. The first obfuscated message includes a first obfuscation seed and a first message payload. Also, the first obfuscated message is received from the first endpoint device over the first network as a first plurality of message segments which are reordered prior to transmission. First de-obfuscation instructions associated with the first obfuscated message are also received from the obfuscation driver. The first obfuscated message is de-obfuscated, including reordering the first plurality of message segments based on the first de-obfuscation instructions resulting in a first de-obfuscated message.

In an example, the first de-obfuscated message is forwarded to an application. A first response message including a second message payload is received from the application. Second de-obfuscation instructions associated with the first response message are created. A second obfuscation seed is generated from at least part of the first obfuscation seed. The second obfuscation seed is sent to the obfuscation driver. A third obfuscation seed is also received from the obfuscation driver. The first response message is obfuscated by reordering a second plurality of message segments of the first response message based on the second de-obfuscation instructions resulting in a first obfuscated response message. The second de-obfuscation instructions and the first obfuscated response message are sent to the obfuscation driver, and the third obfuscation seed is included in the first obfuscated response message. A second obfuscated message of the first obfuscated communication session is received from the obfuscation driver, and the second obfuscated message includes a fourth obfuscation seed and a third message payload. The second obfuscated message is received from the first endpoint device over the first network, and the second obfuscated message is received as a third plurality of message segments, which are reordered prior to transmission. Third de-obfuscation instructions associated with the second obfuscated message are received from the obfuscation driver. The second message is de-obfuscated, including by reordering the third plurality of message segments based on the second de-obfuscation instructions resulting in a second de-obfuscated message.

Additional features and advantages of the disclosed method and apparatus are described in, and will be apparent from, the following Detailed Description and the Figures.

DETAILED DESCRIPTION OF EXAMPLE EMBODIMENTS

Figure 1A:
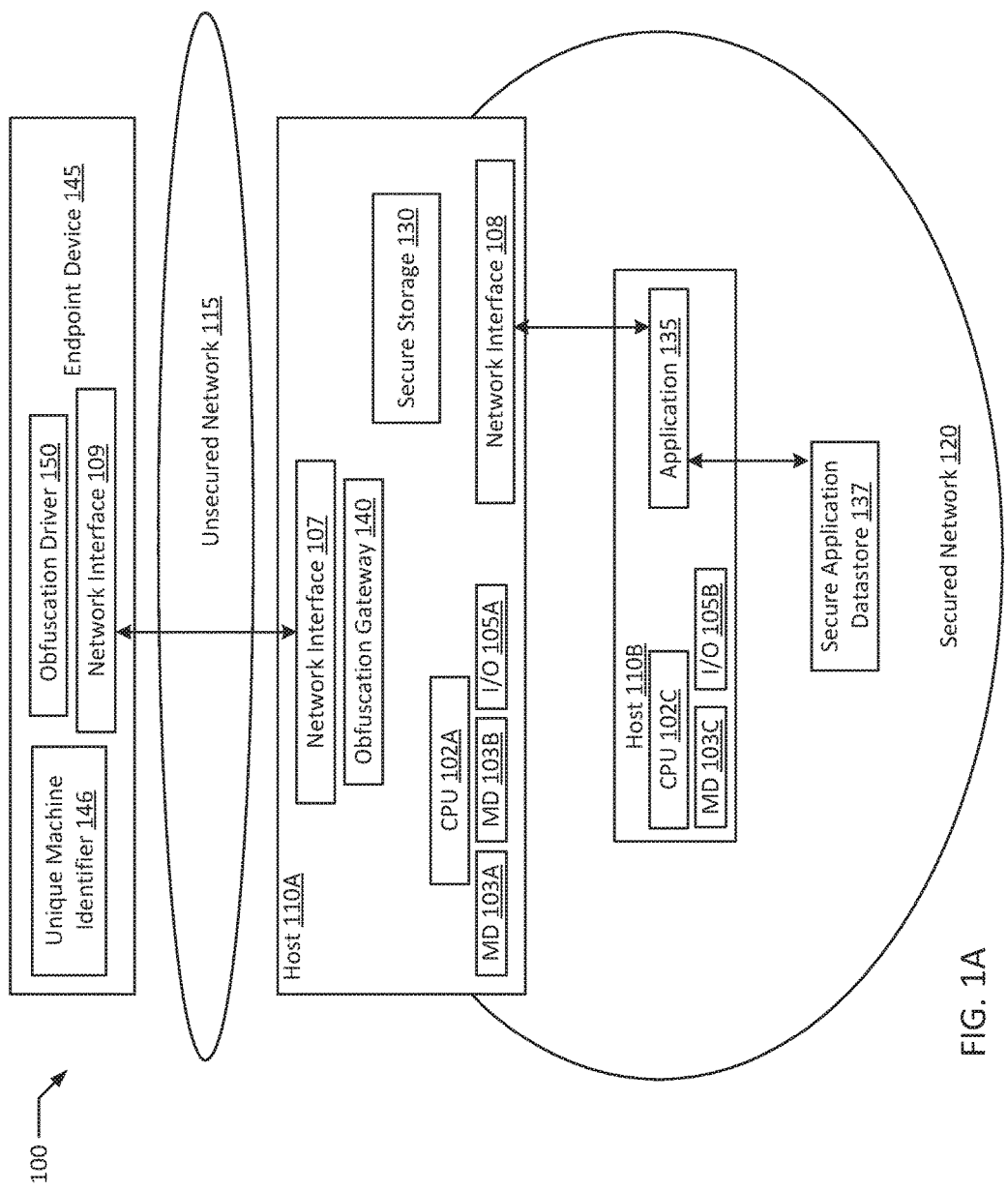
FIGS. 1A and 1B are block diagrams of a network data obfuscation system between a secure network and an endpoint device according to an example of the present disclosure.

Remotely located processing capacity for computer systems has been a concept utilized for as long as computer systems have been networked together. As compute capacity leverages cloud based solutions more and more, the security of a vital link between an endpoint device that utilizes such compute capacity and a secured network representing the private or public cloud solution housing the compute capacity becomes ever more important. Endpoint devices accessing the compute capacity may be a very wide range of devices indeed, from classic endpoint computing terminals (e.g., desktop and laptop computers), to mobile devices (e.g., tablets, cellular phones, smart watches, smart glasses, head-up displays, virtual reality displays), to Internet of Things ("IoT") endpoint devices which may include household appliances (e.g., smart TVs, washers, driers, refrigerators, dishwashers, ovens, vacuum cleaners etc.), robotic drones (e.g., flying unmanned aerial vehicles, robotic submarines, tracked and wheeled ground based drones, industrial robots, etc.), driverless vehicles (e.g., family cars, mass transit trains and busses, trucks, industrial equipment, tractors, combines, etc.), and various specific function devices (e.g., security cameras, gates, thermostats, light bulbs, etc.). Any device capable of connecting to a network and accessing additional computational resources across that network may be an endpoint device of the future, such that each internet user may start interacting with more and more endpoint devices on a daily basis as more devices are developed with network capabilities in mind. In many products, tradeoffs are typically made between factors such as battery life, hardware cost, size, weight, data security, and other physical constrains placed on a product both from a form factor perspective and from a marketability or profitability perspective. These factors may typically point towards an increased reliance on the availability of network resources.

Virtualization allows computer systems to be quickly scaled to meet the processing demands of the moment, generally without paying for or wasting significant excess capacity that may not be needed. Typically, a multi-tenant cloud provider hosts many applications on many virtual machines belonging to many different tenants. Virtualization through the use of isolated guests such as virtual machines ("VMs") or containers may allow a programmer to quickly scale the deployment of applications to the volume of traffic requesting the applications. VMs may be deployed in a variety of hardware environments. There may be economies of scale in deploying hardware in a large scale. A cloud provider may rent or sell excess computing capacity on extra hardware deployed to, for example, achieve per unit cost savings on hardware, or for the express purpose of creating a revenue stream from such rentals. A programmer may hire one or more cloud providers to provide contingent space for situations where the programmer's applications may require extra compute capacity, becoming a tenant of the cloud provider. A tenant may flexibly launch more or less copies of virtual machines and more or less copies of applications in response to the ebb and flow of traffic. A typical cloud provider may be unaware of the specific contents of the traffic, for example, due to contractual privacy terms or encryption.

Typical encryption implementations for network communications involves implementations of secure socket layer ("SSL") or transport layer security ("TLS") encryption on an otherwise insecure hypertext transfer protocol ("HTTP") connection, resulting in a HTTP Secure ("HTTPS") connection. In a typical communication loop, three parties are involved, a server, a client, and a certificate authority. Typically, at least the server will have a certificate with a long-term public and private key used to generate short term session keys, the session keys being used to encrypt traffic for any given communication session. For example, a public key may be shared and used to encrypt information that may only be decrypted using the private key. In an example, a session key may be transmitted from a client who encrypts the session key with a server's public key, and the server may decrypt the session key with its private key, allowing further communications in the session to use the session key. In some examples, the client will also have a certificate with long-term public and private keys, and the session key may be jointly generated with a combination of the client and the server's long term keys. The certificate authority(ies) verify that each party (e.g., client and server) in fact are who they say they are. In order to support interoperability of devices of different makes, session key generation and methods of encryption are generally selected from a finite list of possibilities, in part defined by the suppliers of the client and the server's connection establishing software.

Numerous potential vulnerabilities exist in typical HTTPS connections between a client and a server, with the long-term keys and certificate authorities representing often exploited weak points in the protocol. For example, in many instances, due to requirements for backwards compatibility, a compromised long-term private key may allow a malicious actor holding such a private key to attempt to decrypt previously recorded encrypted transmissions. In an example, intercepted encrypted network traffic between two parties that is recorded, may be decrypted using a private key obtained at a later date, for example through a court order or social engineering, to retroactively generate the session key in a predictable manner. In an example, successful generation of the session key may be validated by validating attempted decryption results against publically available portions of the transmission. In an example, a banking transaction may be secured via HTTPS. In the example, anyone with an account at the bank may be able to access the bank's webpage, and so may be able to download a copy of the webpage's component parts that are not account specific (e.g., layout of the webpage) to use to verify the successful guessing of a session key (e.g., if the non-account specific components match up, the remaining components may now be properly decrypted account specific information). Depending on the strength of the encryption used, even without a private key, it may be possible to decrypt a full transmission using publically available parts of the transmission as a cipher with brute force.

Another exploitable weakness tends to be certificate authorities themselves, as certificate authorities are the entities who validate that the holder of a certificate obtained the certificate through the certificate authority. Subversion of a certificate authority by force or by trickery is a possible avenue through which a "secure" connection may be rerouted without parties noticing. For example, if a particular certificate authority were ordered by their government to issue a certificate to the government identifying a server as belonging to a particular company, traffic to and from that server would be trusted as originating from the particular company by any party who is configured to "trust" the particular certificate authority. Similarly, such bogus certificates have been obtained by malicious actors through social engineering, where the malicious actors have pretended to be representatives of operating system providers or financial services companies. For example, where a bogus certificate is issued in an operating system provider's name, a malicious actor may be able to issue fake software updates in that operating system provider's name compromising numerous other security features of the system. In an example, a certificate authority may have records of public and private keys for certificates it signs and vouches for, and a breach of the certificate authority's security may allow a party to fake authentications as any party who's keys are compromised.

The present disclosure aims to address some of the vulnerabilities and deficiencies with encryption based, especially certificate based network authentication methods. In an example, an additional layer of obfuscation, rather than typical cryptographic methods, is added to existing network transmissions, thereby making messages transmitted with the additional network data obfuscation protocols un-decryptable even in the event of compromised private or session keys, without first being de-obfuscated. In the example, obfuscation is performed in a relatively processing un-intensive method as compared to encryption for low additional overhead, but when coupled with an encrypted message, the result may be undecipherable without physical compromise of the obfuscation systems. In an example, obfuscation may be achieved through a obfuscation seed and unique machine identifier, with the obfuscation seed, and message specific de-obfuscation instructions changing both with each message in a communication session, and between messages of the communication session periodically. In an example, the obfuscation infrastructure may be inserted between any two points in a network communication chain, and may operate on any encrypted traffic between the two points, in a manner seamless to any other hops the message may take before or after the obfuscation infrastructure. For example, the obfuscation infrastructure may be seamlessly retrofitted to existing networks with the addition of obfuscation gateways at existing security and firewall gateways between each of two secured networks and an unsecured network (e.g., the internet), but any internal routing within the secured networks before reaching the gateways need not be impacted or aware of the obfuscation infrastructure. In an example, processing overhead may be low enough to implement the presently disclosed network data obfuscation on IoT endpoint devices with very limited processor capabilities.

Figure 1B:
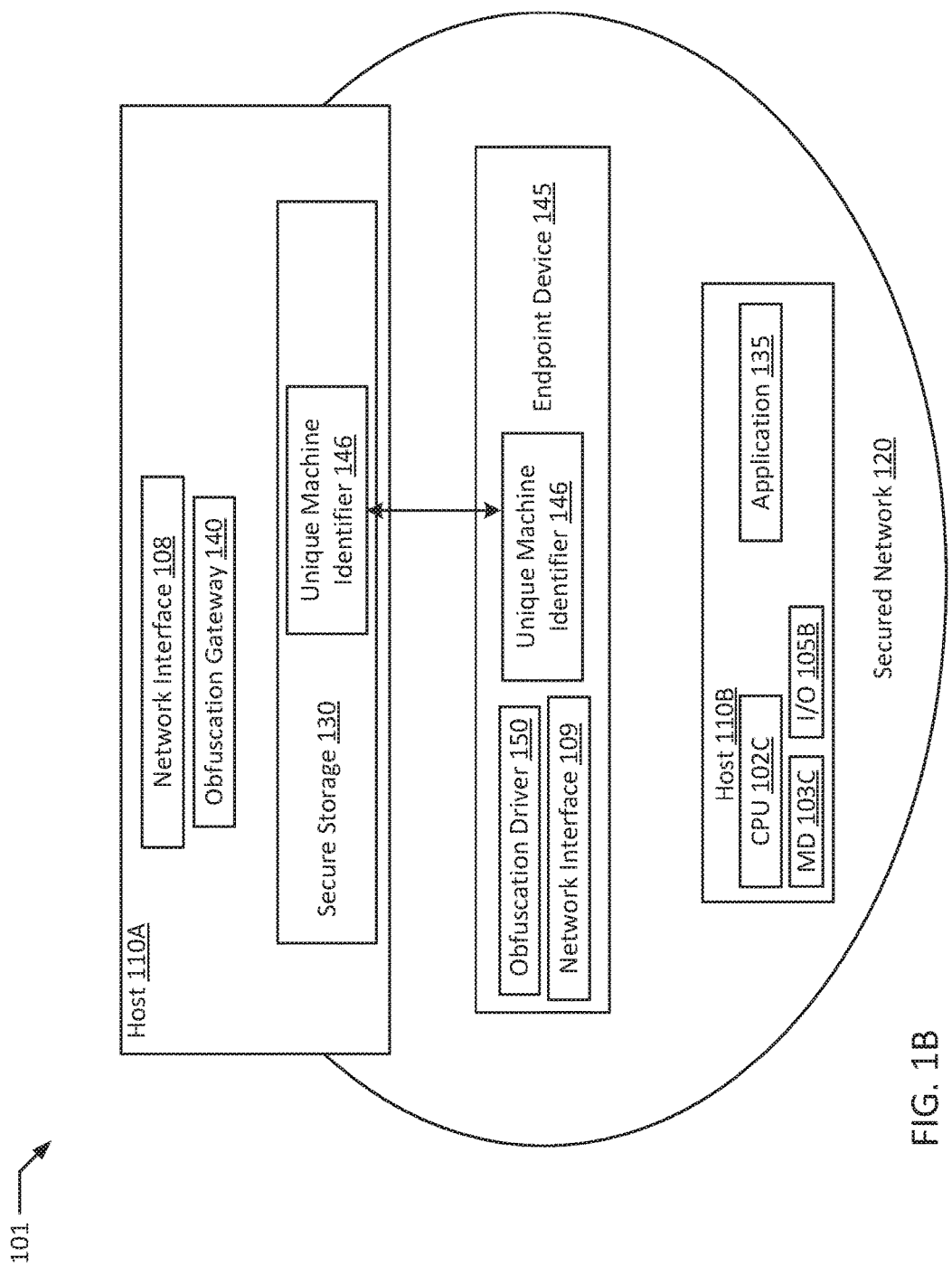

FIGS. 1A and 1B are block diagrams of a network data obfuscation system between a secure network and an endpoint device according to an example of the present disclosure. In an example as illustrated in FIG. 1A, endpoint device 145 may be a smart phone. In other examples, endpoint device 145 may be any network accessible device, including but not limited to computing terminals (e.g., desktop and laptop computers), to mobile devices (e.g., tablets, cellular phones, smart watches), to Internet of Things ("IoT") endpoint devices which may include household appliances (e.g., smart TVs, HUDs, washers, driers, refrigerators, dishwashers, ovens, vacuum cleaners etc.), robotic drones (e.g., flying unmanned aerial vehicles, robotic submarines, tracked and wheeled ground based drones, industrial robots, etc.), driverless vehicles (e.g., family cars, mass transit trains and busses, trucks, industrial equipment, tractors, combines, etc.), and various specific function devices (e.g., security cameras, gates, thermostats, light bulbs, etc.). Endpoint device 145 may include a network interface 109 (e.g., a wired or wireless network interface) capable of connecting to networks including unsecured network 115. In an example, unsecured network 115 may be, for example, a public network (e.g., the Internet), a private network (e.g., a local area network (LAN) or wide area network (WAN)), or a combination thereof. Endpoint device 145 may further be configured with an obfuscation driver 150, capable of performing network data obfuscation. In an example, obfuscation drier 150 may be installed on endpoint device 145 from a known secure source. In an example, endpoint device 145 also includes a unique machine identifier 146, which is generated during an initialization process of obfuscation driver 150.

In an example, host 110A may be a network gateway between secured network 120 and unsecured network 115. In an example, secured network 120 may be, for example, a public network (e.g., the Internet), a private network (e.g., a local area network (LAN) or wide area network (WAN)), or a combination thereof. The system 100 may include one or more interconnected hosts (e.g., hosts 110A-B). Each host 110A-B may in turn include one or more physical processors (e.g., CPU 102A-C) communicatively coupled to memory devices (e.g., MD 103A-C) and input/output devices (e.g., I/O 105A-B). As used herein, physical processor or processors (Central Processing Units "CPUs") 102A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 103A-C refers to a volatile or non-volatile memory device, such as RAM, ROM, EEPROM, or any other device capable of storing data. As discussed herein, I/O device 105A-B refers to a device capable of providing an interface between one or more processor pins and an external device, the operation of which is based on the processor inputting and/or outputting binary data. CPUs 102A-C may be interconnected using a variety of techniques, ranging from a point-to-point processor interconnect, to a system area network, such as an Ethernet-based network. Local connections within each host 110A-B, including the connections between a processor 102A and a memory device 103A-B and between a processor 102A and an I/O device 105A may be provided by one or more local buses of suitable architecture, for example, peripheral component interconnect (PCI).

In computer systems (e.g., system 100), it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a VM may be a robust simulation of an actual physical computer system utilizing a hypervisor or a component (e.g., a virtual machine manager) that executes tasks commonly executed by hypervisors to allocate physical resources to the virtual machine. In an example, secured network 120 may operate within a cloud environment. In such an example, hosts 110A-B may be virtual machines executing on top of physical hosts, possibly with a hypervisor executing between the virtualized layer and the physical hosts. In another example, hosts 110A-B may be physical hosts, but certain component parts of hosts 110A-B may be hosted in isolated guests (e.g., secure storage 130, application 135, obfuscation gateway 140, etc.). In an example, various components of system 100 may execute on containers (e.g., application 135), and the quantity of containers executing as any particular component may be scaled dynamically. In an example, containers executing various components of endpoint control service 110 may be organized into microservices.

In an example, host 110A includes at least two network interfaces (e.g., network interfaces 107 and 108). In the example, network interface 107 may face unsecured network 115, and network interface 108 may face secured network 120. In an example, host 110A acts as a gateway for traffic between secured network 120 and unsecured network 115. In an example, obfuscation gateway 140 on host 110A performs network data obfuscation on traffic outbound to unsecured network 115, and de-obfuscates any messages from connected endpoint devices (e.g., endpoint device 145) residing across unsecured network 115. In an example, secure storage 130 may be stored in any suitable type of database, for example, a relational database. The secure storage 130 may be stored in a database associated with a database management system (DBMS). A DBMS is a software application that facilitates interaction between the database and other components of the system 100. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, the secure storage 130 may be stored in a database organized as a formal database with a schema such as a relational schema with defined tables, indices, links, triggers, various commands etc. In some examples, secure storage 130 may not be organized as a formal database, but may instead be an alternative storage structure capable of holding the information stored in secure storage 130, including but not limited to a file, folder, directory, registry, etc. In an example, secure storage 130 is stored in non-volatile storage.

In an example, host 110B is an application server hosting application 135. In the example, application 135 accesses data in secure application datastore 137. In an example, as with secure storage 130, secure application datastore 137 may be any type of database, including a relational database associated with a DBMS, or secure application datastore 137 may be any other type of suitable data storage including but not limited to a file, folder, directory, registry, etc. In an example, application 135 may be in communication with endpoint device 145 through an obfuscated, secure communication channel through network interface 108, obfuscation gateway 140, network interface 107, network interface 109, and obfuscation driver 150.

In an example, system 101 as illustrated in FIG. 1B, represents an initialization and activation of endpoint device 145, including obfuscation driver 150. In system 101, endpoint device 145 is physically brought inside of secure network 120 for initialization (e.g., inside a physically secure building). During initialization, a unique machine identifier 146 is collaboratively generated by obfuscation driver 150 and obfuscation gateway 140, and the unique machine identifier 146 is stored in non-volatile storage in secure storage 130 as well as on endpoint device 145. In an example, during initialization, endpoint device 145 may be connected to host 110A through a wired connection, or through a secure, localized wireless connection. For example, a secure, localized wireless connection may include near-field communications, short wave-length radio, or WiFi connections.

Figure 2:
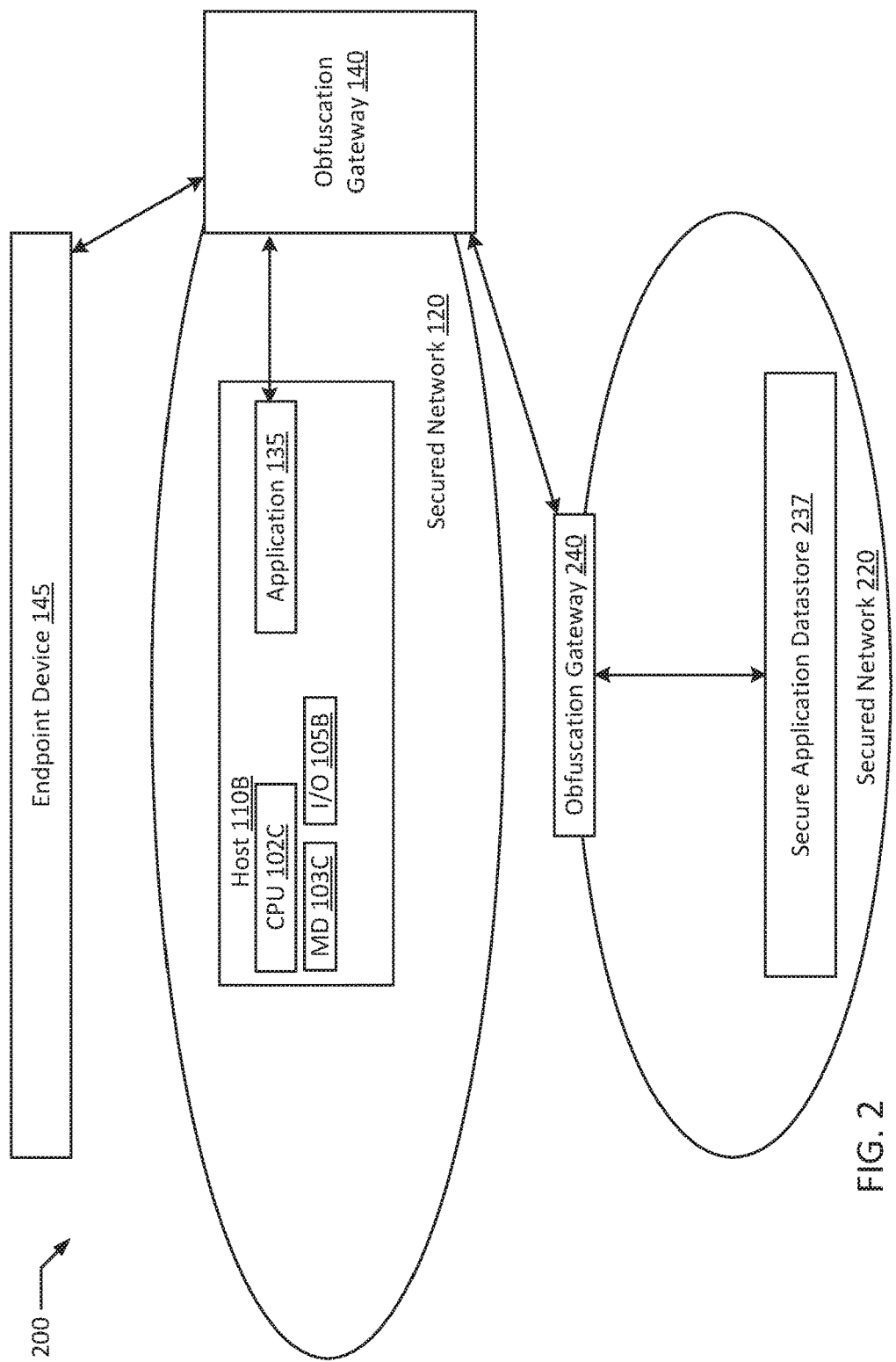
FIG. 2 is a block diagram of a network data obfuscation system between two secure networks and an endpoint device according to an example of the present disclosure.

FIG. 2 is a block diagram of a network data obfuscation system between two secure networks and an endpoint device according to an example of the present disclosure. System 200 as illustrated in FIG. 2 is an extension of system 100, where in addition to accessing secure application datastore 137, application 135 also accesses data from secure application datastore 237. In the example, secure application datastore 237 is located in a different physical location (e.g., in a datacenter in another state) from host 110B hosting application 135. In the example, a secure, encrypted, obfuscated connection may be permanently or semi-permanently established between obfuscation gateway 140, and an obfuscation gateway 240 which provides functionality substantially similar to obfuscation gateway 140. In an example, application 135 may retrieve data from secure application datastore 237 via obfuscation gateways 140 and 240, before using the retrieved data to deliver an output to endpoint device 145 through obfuscation gateway 140.

Figure 3:
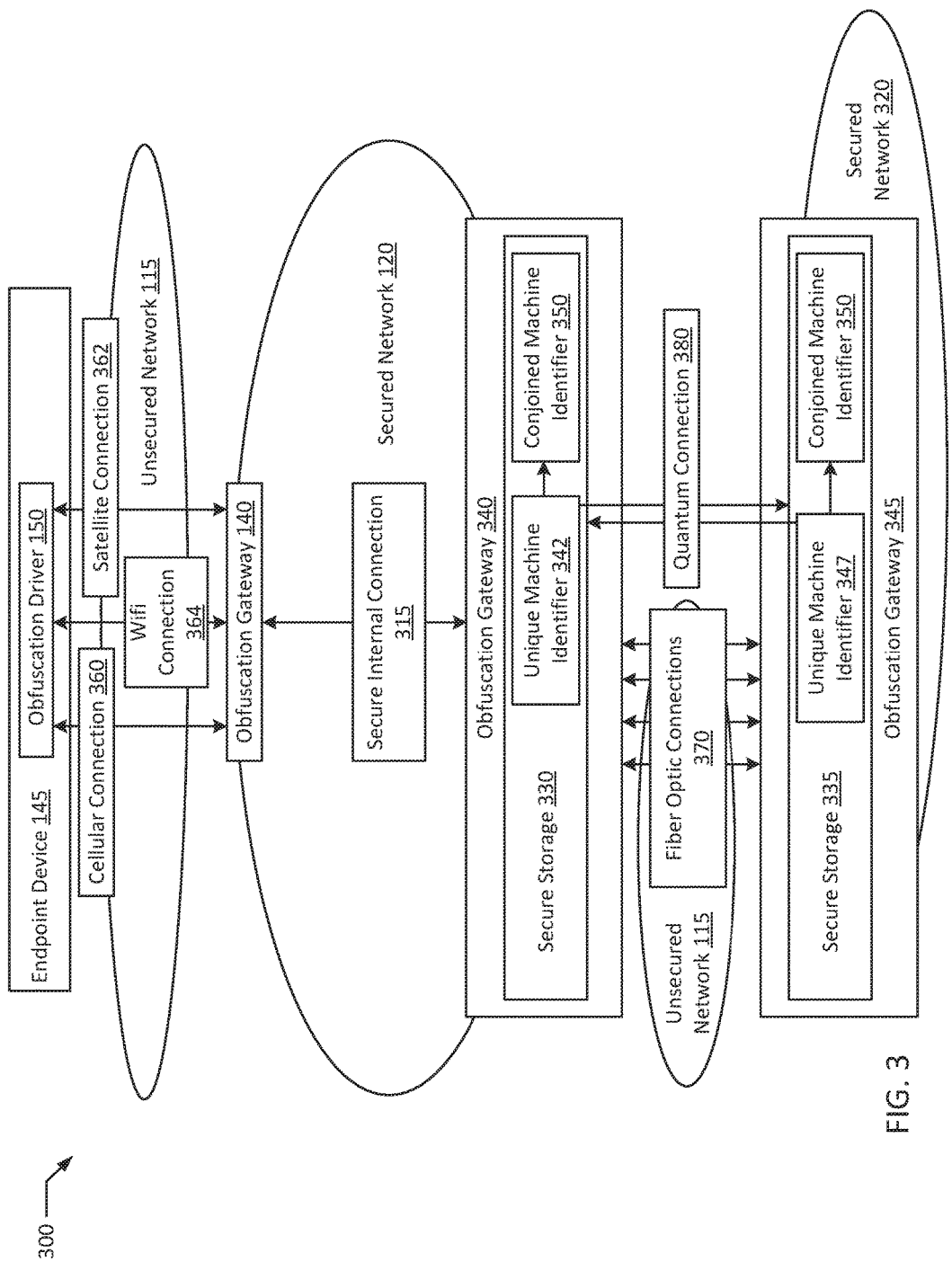
FIG. 3 is a block diagram of an obfuscated communication session being initialized between two secure networks while performing network data obfuscation according to an example of the present disclosure.

FIG. 3 is a block diagram of an obfuscated communication session being initialized between two secure networks while performing network data obfuscation according to an example of the present disclosure. System 300 as illustrated in FIG. 3 illustrates end to end communications between an endpoint device 145 with obfuscation driver 150, and an obfuscation gateway 345 acting as a gateway to secured network 320, much as obfuscation gateway 140 acts as a gateway to secured network 120. In an example, cellular connection 360, satellite connection 362, and WiFi connection 364 represent different routing paths a message between obfuscation driver 150 and obfuscation gateway 140 may traverse unsecured network 115. In an example, secure internal connection 315 may be a wired connection between host 110A hosting obfuscation gateway 140, and a host hosting obfuscation gateway 340. In the example, obfuscation gateway 340 may be a second gateway to unsecured network 115 from secured network 120. In an example, obfuscation gateway 340 and obfuscation gateway 345 may jointly initialize a secure, encrypted, obfuscated connection that may be permanently or semi-permanently established between obfuscation gateway 340 and obfuscation gateway 345, and therefore between secured network 120 and secured network 320. In an example, part of the initialization handshake between obfuscation gateways 340 and 345 may pass through unsecured network 115, specifically fiber optic connections 370, while other portions may pass through a secured connection (e.g., quantum connection 380), including at least part of the exchange for generating and storing conjoined machine identifier 350 on both secure storages 330 and 335, based on unique machine identifier 342 of obfuscation gateway 340, and unique machine identifier 347 of obfuscation gateway 345.

Figure 4A:
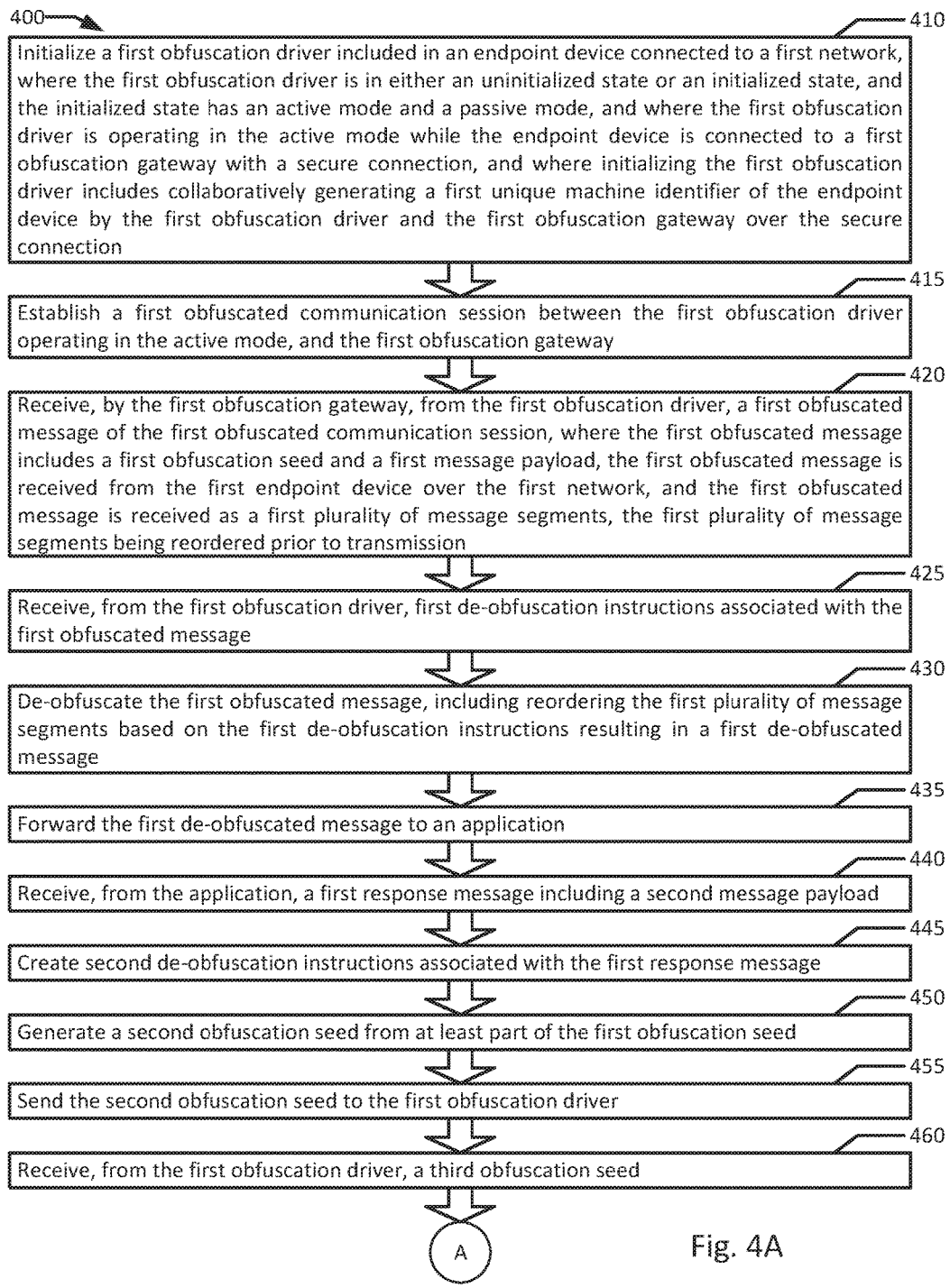
FIGS. 4A and 4B are a flowchart illustrating an example of network data obfuscation according to an example of the present disclosure.
Figure 4B:
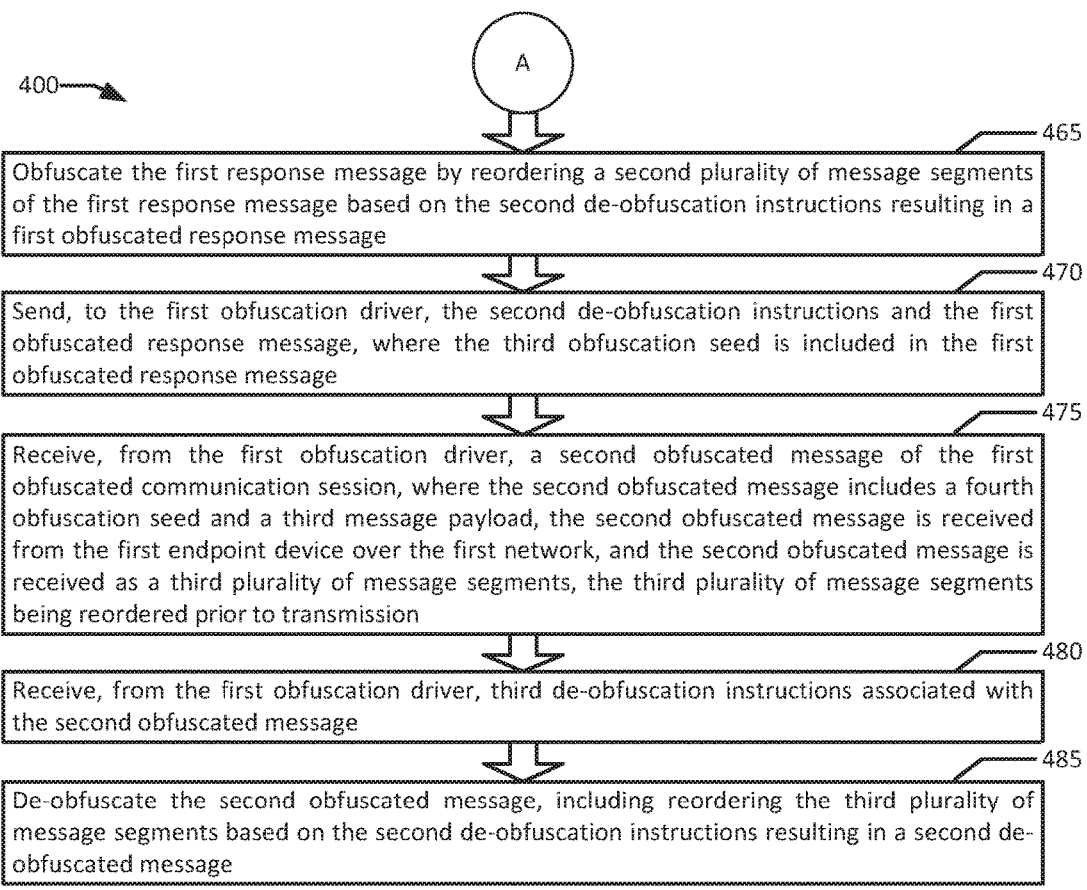

FIGS. 4A and 4B are a flowchart illustrating an example of network data obfuscation according to an example of the present disclosure. Although the example method 400 is described with reference to the flowchart illustrated in FIGS. 4A and 4B, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method is performed by an obfuscation gateway 140 in communication with an obfuscation driver 150.

The example method 400 may begin with initializing a first obfuscation driver included in an endpoint device connected to a first network, where the first obfuscation driver is in either an uninitialized state or an initialized state which has an active mode and a passive mode, and where the first obfuscation driver is operating in the active mode while the endpoint device is connected to a first obfuscation gateway with a secure connection, and where initializing the first obfuscation driver includes collaboratively generating a first unique machine identifier of the endpoint device by the first obfuscation driver and the first obfuscation gateway over the secure connection (block 410). For example, obfuscation driver 150 may be a component part of endpoint device 145, connected to unsecured network 115. In the example, during initialization, endpoint device 145 may be brought into secured network 120 to be connected to obfuscation gateway 140 over a connection analogous to secure internal connection 315. For example, endpoint device 145 may be connected to host 110A with a wired connection (e.g., ethernet, USB, SCSI, etc.) or via a short distance wireless connection that does not extend beyond a physically secure space (e.g., near-field communications, short wavelength radio, Bluetooth®, WiFi, etc.). In another example, endpoint device 145 may be connected to a separate physical host that is in turn securely connected to host 110A. In a high security deployment, a physical unidirectional security gateway may additionally be employed to protect and isolate obfuscation gateway 140 from a possibly compromised endpoint device 145. In some examples, while connected to obfuscation gateway 140, endpoint device 145 may maintain a cellular connection 360 to unsecured network 115. In other examples, all unsecured connections for endpoint device 145 may be disabled for the duration of initialization. In an example, obfuscation driver 150 may have an active mode and a passive mode. In active mode, obfuscation driver 150 may actively obfuscate network traffic through network interface 109. In an example, when obfuscation driver 150 is in active mode, all network traffic may be routed through obfuscation gateway 140 rather than directly to unsecured network 115 (e.g., the internet). In an example, obfuscation driver 150 may default to a passive, standby mode when endpoint device 145 is not accessing resources on secured network 120, allowing direct browsing of unsecured network 115 (e.g., the internet). In an example, obfuscation driver 150 enters the active mode upon successful authentication by an authorized user of endpoint device 145 (e.g., a biometric scan, a password verification, a token verification, or a cellular network verification). In an example, a prompt for authentication and activation of obfuscation driver 150 is generated based on a request for resources inside of secure network 120 (e.g., application 135).

In an example, obfuscation driver 150 may not establish obfuscated communications sessions with obfuscation gateway 140 until obfuscation driver 150 undergoes initialization and transitions from an uninitialized state to an initialized state. In some examples, obfuscation driver 150 may be relegated to an uninitialized state if endpoint device 145 is suspected of being compromised (e.g., due to failed authentications). In an example, obfuscation driver 150 may require initialization separately with each obfuscation gateway (e.g., obfuscation gateways 140, 240, 340, and 345) it wishes to establish obfuscated communication sessions with. In another example, obfuscation gateway 140 may send a unique machine identifier 146 of endpoint device 145 to other obfuscation gateways (e.g., obfuscation gateways 240, 340, and 345) trusted by obfuscation gateway 140, allowing obfuscation driver 150 to communicate with the trusted obfuscation gateways 240, 340, and/or 345. In an example, unique machine identifier 146 of endpoint device 145 is collaboratively generated by obfuscation driver 150 and obfuscation gateway 140 while endpoint device 145 is connected to secured network 120. In some examples, obfuscation driver 150 may require authentication to enter into active mode before engaging in collaboratively generating unique machine identifier 146 with obfuscation gateway 140. In an example, inputs used in collaboratively generating unique machine identifier 146 may include endpoint device 145 specific values (e.g., operating system identification number, computing device name, MAC address) and also synchronized global unique identifiers ("Guids"). In an example, specific values used to generate unique machine identifier 146 may be stored on endpoint device 145 in a permanent manner not erasable by endpoint device 145. In an example, synchronizing a Guid may require a secure connection between obfuscation driver 140 and obfuscation gateway 150. In an example, a specific value such as Guid may be based on a CPU clock or a synchronized timestamp. In some examples, a secure connection may be established between obfuscation driver 140 and obfuscation gateway 150 without bringing the endpoint device into secured network 120. In such an example, a substitute secure transmission method may be used, for example, a manual input of the calculated unique machine identifier 146 or inputs to generate unique machine identifier 146 by an authorized user, or a transmission through a physical device such as a flash drive or other non-transitory storage medium delivered by courier or postal mail. In examples where less security is mandated, password authentication over an encrypted network connection may suffice to secure the connection between obfuscation driver 150 and obfuscation gateway 140. For example, device specific information for generating a unique machine identifier may be passed from the endpoint device to the obfuscation gateway through an encrypted HTTPS connection, and the obfuscation gateway may generate and send a unique machine identifier to the endpoint device in response to a successful authentication prompt. The authentication prompt may be a multi-factor authentication including added security such as a token or voice based component.

A first obfuscated communication session is established between the first obfuscation driver operating in the active mode, and the first obfuscation gateway (block 415). In an example, after leaving secured network 120, a user may request on endpoint device 145 to access application 135, and provide proper authentication to obfuscation driver 150 to initiate a handshake sequence between obfuscation driver 150 and obfuscation gateway 140. Further details regarding an example handshake process for establishing an obfuscated communication session may be found in the discussion of FIG. 5 below.

After successfully establishing the first obfuscated communication session, the first obfuscation gateway receives, from the first obfuscation driver, a first obfuscated message of the first obfuscated communication session, where the first obfuscated message includes a first obfuscation seed and a first message payload, the first obfuscated message is received from the first endpoint device over the first network, and the first obfuscated message is received as a first plurality of message segments, the first plurality of message segments being reordered prior to transmission (block 420). In an example, after a successful handshake between obfuscation gateway 140 and obfuscation driver 150, obfuscation driver 150 may send a first obfuscated message with a functional message payload (e.g., the request to access application 135). In an example, each obfuscated message includes at least several component parts (e.g., an internet protocol header, an obfuscation header, and a payload of obfuscated data). In various examples, headers may or may not be obfuscated by obfuscation gateway 140. In an example, each obfuscated message including the first obfuscated message is broken apart into a plurality of message segments which are reordered prior to transmission. In an example, the reordering of message segments is based on de-obfuscation instructions. In an example, when the first obfuscated message has its message segments reordered, message segments from a separate message may be interspersed and mixed into the message segments from the first obfuscated message. In an example, the separate message may be a request for another application, or the separate message may be comprised of decoy data. For example, decoy data may be inserted to simulate higher amounts of obfuscated traffic, or to increase the degree to which the first obfuscated message is obfuscated by reordering message segments. In an example, decoy data may be used to disguise handshake messages. In an example, various message segments of the first obfuscated message may be sent from obfuscation driver 150 to obfuscation gateway 140 via different routing paths (e.g., cellular connection 360, satellite connection 362, and WiFi connection 364). In an example, the first obfuscated message is encrypted prior to being obfuscated. In another example, the first obfuscated message is first obfuscated then encrypted.

In an example, first de-obfuscation instructions associated with the first obfuscated message are received from the first obfuscation driver (block 425). For example, the first obfuscated message may be obfuscated by obfuscation driver 150 based on first de-obfuscation instructions. In an example, at least part the first de-obfuscation instructions may be included in the obfuscation header of the first obfuscated message. In an example, first de-obfuscation instructions may be based in part on an obfuscation seed sent to obfuscation driver 140 by obfuscation driver 150 during the handshake process. The first obfuscated message is then de-obfuscated, including reordering the first plurality of message segments based on the first de-obfuscation instructions resulting in a first de-obfuscated message (block 430). In an example, the steps taken to obfuscate the first obfuscated message performed in reverse results in the first de-obfuscated message. In an example, these steps are included in the first de-obfuscation instructions. In an example, de-obfuscation instructions include a reference to the particular type of obfuscation performed on the first obfuscated message.

In various examples, de-obfuscation instructions may be more or less specific. For example, a set of agreed obfuscation patterns may be included during a handshake process, with each specific obfuscation instruction being a reference to one or more of the agreed obfuscation patterns. In another example, each obfuscation instruction may include several possible obfuscation patterns to try, with a "correct" obfuscation pattern being identified based on successfully matching a predefined value. For example, a de-obfuscation instruction may include three obfuscation patterns, with the correct pattern being identifiable based on the correct pattern revealing the previous key sent by the obfuscation gateway performing the de-obfuscation. Similarly, a message may be sent with a request that the response be obfuscated with one of a plurality of obfuscation patterns, thereby validating a proper response based on receiving a response obfuscated in one of the plurality of obfuscation patterns. In an example, the type of obfuscation performed in a message from the obfuscation driver 150 to the obfuscation gateway 140 may be dictated in a previous message, and vice versa. Upon successful de-obfuscation, the first de-obfuscated message is forwarded to an application (block 435). In an example, the first de-obfuscated message from endpoint device 145 may be a request to execute application 135, and therefore upon de-obfuscation of the obfuscated message, the newly de-obfuscated message is forwarded to application 135. In an example, secure internal connection 315 or a substantially similar connection is used to forward the message to application 135.

In an example, a first response message including a second message payload is received from the application (block 440). In an example, application 135 executes and composes a response message to endpoint device 145 in the form of a second message payload. In an example, application 135 may have required data from secure application datastore 137 to perform its task. In the example, accessing a secure application datastore may be logged into a memory and reported to an administrator for security purposes. To access secure application datastore 137, application 135 may have sent a data request. In an example, even where both secure application datastore 137 and application 135 reside within secured network 120, a data request to secure application datastore 137 may be intercepted by a second obfuscation gateway of secure network 120. In the example, the second obfuscation gateway may establish a second obfuscated communication session with a second obfuscation driver (e.g., an obfuscation driver executing on the host of the secure application datastore 137). In the example, the data request may be obfuscated resulting in a third obfuscated message and fourth de-obfuscation instructions, which may be transmitted to the second obfuscation driver. The second layer of obfuscation further secures data retrievals of potentially sensitive information in secure application datastore 137. In response, the secure application datastore 137 may send to application 135, via the second obfuscation driver, and application 135 may receive, a fourth obfuscated message and fifth de-obfuscation instructions. In an example, the fourth obfuscated message includes the data requested by application 135.

After the obfuscation gateway receives the first response message, second de-obfuscation instructions associated with the first response message are created (block 445). For example, obfuscation gateway 140 may use the then current first obfuscation seed to generate second de-obfuscation instructions. However, in another example, prior to the first response message being sent, the obfuscation gateway may generate a second obfuscation seed from at least part of the first obfuscation seed (block 450). The second obfuscation seed may be sent to the first obfuscation driver (block 455). In response, the obfuscation gateway may receive, from the first obfuscation driver, a third obfuscation seed (block 460). In an example, based on a time elapsed or an obfuscated message count, obfuscation gateway 140 determines that it should refresh the obfuscated communications session with a fresh set of obfuscation seeds. In the example, obfuscation gateway 140 may generate an obfuscation seed and perform a seed exchange with obfuscation driver 150. In an example, the seed exchange for the third obfuscation seed and the fourth obfuscation seed are sent with obfuscated decoy data as no payload data may have been available. In the example, without decoy data, the small packet size of a pure seed exchange may draw attention to the special seed exchange messages. In an example, the location of the first obfuscation seed and obfuscation header in the first obfuscated message is in a different location within the first obfuscated message as the location of, for example, the third obfuscation seed and obfuscation header in the obfuscated message carrying the third obfuscation seed. In an example, each obfuscated message may include instructions for locating the obfuscation seed and obfuscation header in a subsequent response message. In an example, the second de-obfuscation instructions may be regenerated with the third obfuscation seed. In another example, the second de-obfuscation instructions may be originally generated with the third obfuscation seed.

The first response message is obfuscated by reordering a second plurality of message segments of the first response message based on the second de-obfuscation instructions resulting in a first obfuscated response message (block 465). In an example, obfuscation gateway 140 reorders message segments of the first response message, along with additional decoy data message segments, based on the second de-obfuscation instructions to yield a first obfuscated response message. The first obfuscation gateway sends to the first obfuscation driver the second de-obfuscation instructions and the first obfuscated response message, where the third obfuscation seed is included in the first obfuscated response message (block 470). In an example, obfuscation gateway 140 responds to a request from obfuscation driver 150 requesting that application 135 perform a task. The resulting first obfuscated response message from obfuscation gateway 140 may include de-obfuscation instructions and a new obfuscation seed. In an example, endpoint device 145 may have been able to access application 135 directly prior to an installation of obfuscation gateway 140 and obfuscation driver 150. In the example, system 100 may have been retrofit with obfuscation driver 150 and obfuscation gateway 140. In an example, obfuscation gateway 140 and obfuscation driver 150 may each be self-contained, may only affect network transmissions through network 115 by intercepting inbound and outbound communications. In the example, the installation of obfuscation gateway 140 and obfuscation driver 150 may be transparent to application 135, which may execute identically with no required code changes or patching both prior to and after retrofitting obfuscation driver 150 to endpoint device 145, and obfuscation gateway 140 to host 110A.

A second obfuscated message of the first obfuscated communication session is received from the first obfuscation driver, where the second obfuscated message includes a fourth obfuscation seed and a third message payload, the second obfuscated message is received from the first endpoint device over the first network, and the second obfuscated message is received as a third plurality of message segments, the third plurality of message segments being reordered prior to transmission (block 475). In an example, obfuscation gateway 140 may remotely update obfuscation driver 150. As part of an update, obfuscation gateway 140 may enable different types of obfuscation instructions to be generated by obfuscation driver 150 (e.g., new obfuscation manipulation patterns may be added, and references to existing de-obfuscation instructions may be changed). In an example, endpoint device 145 next sends a request for a report from application 135, the request may be packaged into a second obfuscated message by obfuscation driver 150. In an example, obfuscation driver 150 may have been updated in the meantime, and therefore the second obfuscated message is reordered according to a third set of de-obfuscation instructions that are different from each of the other previous sets of de-obfuscation instructions. In an example, the second obfuscated message is received as a third plurality of reordered message segments. In an example, third de-obfuscation instructions associated with the second obfuscated message are then received from the first obfuscation driver (block 480). In some examples, the third de-obfuscation instructions may be received as part of the second obfuscated message. In other examples, the third de-obfuscation instructions may be a part of a separate message transmit over a secure connection. In an example, the second obfuscated message is de-obfuscated, including reordering the third plurality of message segments based on the third de-obfuscation instructions resulting in a second de-obfuscated message (block 485).

Figure 5:
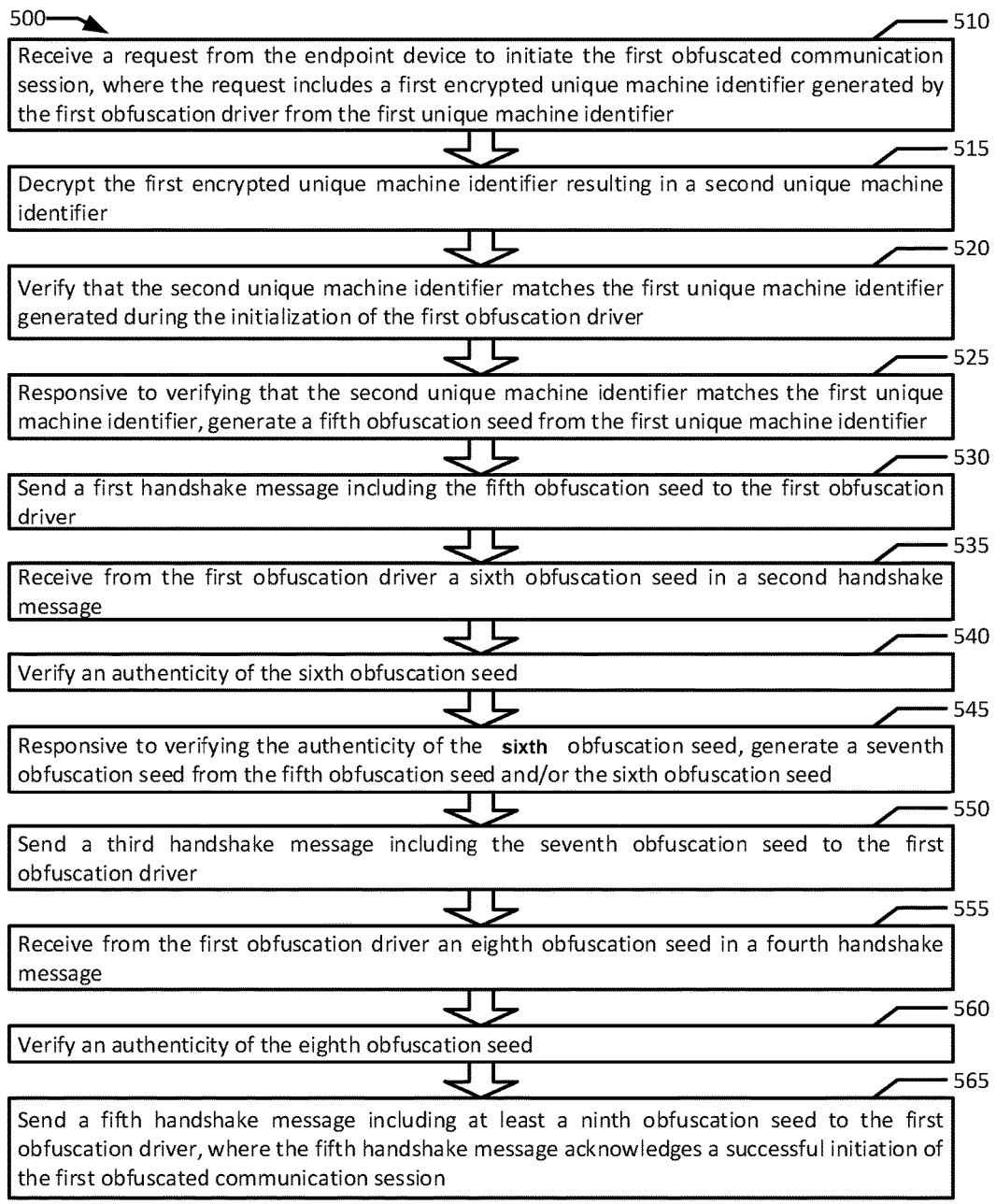
FIG. 5 is a flowchart illustrating an example of initializing an obfuscated communication session according to an example of the present disclosure.

FIG. 5 is a flowchart illustrating an example of initializing an obfuscated communication session according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method is performed by an obfuscation gateway 140 in communication with an obfuscation driver 150.

The example method 500 may begin with receiving a request from the endpoint device to initiate the first obfuscated communication session, where the request includes a first encrypted unique machine identifier generated by the first obfuscation driver from the first unique machine identifier (block 510). In an example, obfuscation driver 150 collaboratively generated unique machine identifier 146 with obfuscation gateway 140. To initialize a new obfuscated communication session, obfuscation driver 150 may first request authentication from an authorized user to enter active mode. In some examples, failing to properly authenticate with the obfuscation driver 150 may result in de-initialization of obfuscation driver 150, requiring re-initialization prior to establishing an obfuscated communication session. In an example, the request to initiate an obfuscated communication session may be sent over a standard HTTPS certificate based encryption connection. In other examples, a special encryption key may be included as part of the initialization process, for use initiating obfuscated communication sessions. In an example, unique machine identifier 146 may be sent as plain text encrypted by certificate based authentication. In more secure examples, unique machine identifier 145 may be first encrypted with reversible encryption based on an agreed encryption key during initialization. In an example, obfuscation driver 150 may be required to be in the active mode to encrypt unique machine identifier 146 with the required encryption for obfuscation gateway 140 to recognize unique machine identifier 146.

The first encrypted unique machine identifier is decrypted resulting in a second unique machine identifier (block 515). In an example, obfuscation gateway 140 decrypts the encrypted unique machine identifier received from obfuscation driver 150. A resulting second unique machine identifier is then verified to match the first unique machine identifier generated during the initialization of the first obfuscation driver (block 520). In an example, obfuscation gateway 140 compares the decrypted unique machine identifier with unique machine identifier 146 in the secure storage 130. In an example, where the verification of the encrypted unique machine identifier fails, the obfuscation gateway 150 may flag endpoint device 145 as potentially compromised and remove unique machine identifier 146 from the secure storage 130 to enforce that endpoint device 145 would require initialization prior to initiating an obfuscated communication session. In an example, responsive to verifying that the second unique machine identifier matches the first unique machine identifier, a fifth obfuscation seed is generated from the first unique machine identifier (block 525). In an example, the above discussed fifth obfuscation seed in block 525 may actually be, chronologically, the first obfuscation seed passed between obfuscation gateway 140 and obfuscation driver 150 of a given communication session, which is sent from obfuscation gateway 140 to obfuscation driver 150 as confirmation that the exchanged unique machine identifier 146 has been validated. In an example, as compared to certificate based encryption, the only trusted source for obfuscation seeds is the obfuscation gateway 150. Each obfuscation driver is programmed, including during initialization to initiate secure, obfuscated sessions with an obfuscation gateway (e.g., obfuscation gateway 150). In such a system, if any one component were compromised, rather than resulting a potential vulnerability such as a man-in-the-middle situation, the most likely result is that no session would be establish-able. For example, if endpoint device 145 were compromised, it is exceedingly unlikely that authentication with obfuscation driver 150 may be achieved to put obfuscation driver 150 into active mode before the obfuscation driver 150 de-initializes itself from authentication failures as possibly compromised. Similarly, the user of endpoint device 145 will likely report the device missing first, resulting in de-initialization from the obfuscation gateway 140. In an example, where certificate authentication has been compromised for the initial handshake, and obfuscation driver 150 connects to a fake obfuscation gateway pretending to be obfuscation gateway 140, the fake obfuscation gateway will be exceedingly unlikely to have the proper initialization data (e.g., unique machine identifier 146) or to issue the correct response to handshake challenges. Similarly, an uninitialized version of an obfuscation driver installed on a different endpoint device would have an exceedingly difficult challenge in establishing an original handshake with an obfuscation gateway without the secured data stored with obfuscation driver 150.

In an example, a first handshake message including the fifth obfuscation seed is sent to the first obfuscation driver (block 530). A sixth obfuscation seed is received from the first obfuscation driver a in a second handshake message (block 535). The obfuscation gateway 140 verifies an authenticity of the sixth obfuscation seed (block 540). Responsive to verifying the authenticity of the sixth obfuscation seed, a seventh obfuscation seed is generated from the fifth obfuscation seed and/or the sixth obfuscation seed (block 545). In an example, there may be some flexibility in generation of the seventh obfuscation seed based on the instructions passed, and the resulting seventh obfuscation seed may be a predictable but non-unique result out of a set of possible results. A third handshake message is sent to the first obfuscation driver including the seventh obfuscation seed (block 550). An eighth obfuscation seed is received from the first obfuscation driver in a fourth handshake message (block 555). An authenticity of the eighth obfuscation seed is then verified (block 560). A fifth handshake message is sent including at least a ninth obfuscation seed to the first obfuscation driver, where the fifth handshake message acknowledges a successful initiation of the first obfuscated communication session (block 565). In an example, in addition to the original exchange of unique machine identifier 146 at least four obfuscation seeds are exchanged between obfuscation gateway 140 and obfuscation driver 150 during a handshake to initiate an obfuscated communication session. Each obfuscation seed during the exchange may include at least part of one previous seed in the chain (but not necessarily the immediately preceding seed) along with calculation results based on instructions for generating the next seed exchanged with each seed. In an example, higher security may be achieved if at least part of a message during the handshake exchange is sent over a different path than the other handshake communications.

In an example, each message sent between obfuscation gateway 140 and obfuscation driver 150 includes an obfuscation seed, and each obfuscation seed is only used once. In the example, each message may include generational instructions for a next obfuscation seed in a chain of obfuscation seeds. In an example, throughout the handshake process, and afterwards during the obfuscated communication session, a stream of obfuscation seeds are continually passed between obfuscation gateway 150 and obfuscation driver 140 based a time elapsed and/or a message count, regardless of whether any payload data is ready to be transmitted between the endpoint device 150 and the application 135. Throughout the transmissions, decoy data may be utilized to avoid drawing suspicion or scrutiny to any particular packets. In an example, a failed verification of any obfuscation seed terminates the handshake process or the active obfuscated communication session, requiring the handshake process to start over. In an example, after several failed verification attempts, the obfuscation gateway 150 may de-initialize endpoint device 145, and thereby prevented from establishing any further obfuscated communication sessions with obfuscation gateway 150. In an example, each obfuscation seed in the stream of obfuscation seeds may be generated with an evolving formula, where the formula is generated by non-deterministic means, such that each seed's generation of a subsequent seed in the exchange uses a one-time formula. If messages are sent over different paths, someone attempting to intercept and later decode messages by brute force will be defeated in at least two ways. First, without knowledge of the additional layer of obfuscation, brute force decryption will never yield sensible results. If a particular message is compromised, the message cannot be de-obfuscated without at least one previous message, which may have been transmitted on a different path, since the location of the obfuscation seed in each message is found in its predecessor. Similarly, a subsequent seed may not be accurately predicted as the formula to generate the next seed is included in part in the current message or a previous message as instructed.

In a simplified example, if a first seed is X, an instruction may be to multiply X by Y for the second seed, resulting in XY. A third seed may be generated with instructions to multiply XY by Z, resulting in key XYZ. A fourth seed may be generated with an instruction to add the component from two messages ago to XYZ, resulting in XYZ+Y. Each of the components other than X which may be the unique machine identifier, would likely be generated by a non-deterministic formula so that the input would not be predictable. With multiple channels and continuous exchanges, the obfuscation is unlikely to be defeated in real time, and unless every message in an entire chain is compromised, after a few exchanges there will tend to be missing information for predicting any subsequent seeds. In various examples, instructions in a given message associated with a given seed may be either instructions regarding a subsequent seed sent by the sender, or instructions to the recipient for the next response, or a combination of both. In an example, a failure to establish an obfuscated communication session (e.g., failed handshakes) or a failure to validate an obfuscation seed after a session is established may be grounds for obfuscation gateway 140 to flag endpoint device 145 as an intruder, blacklisting communications with endpoint device 145.

Figure 6:
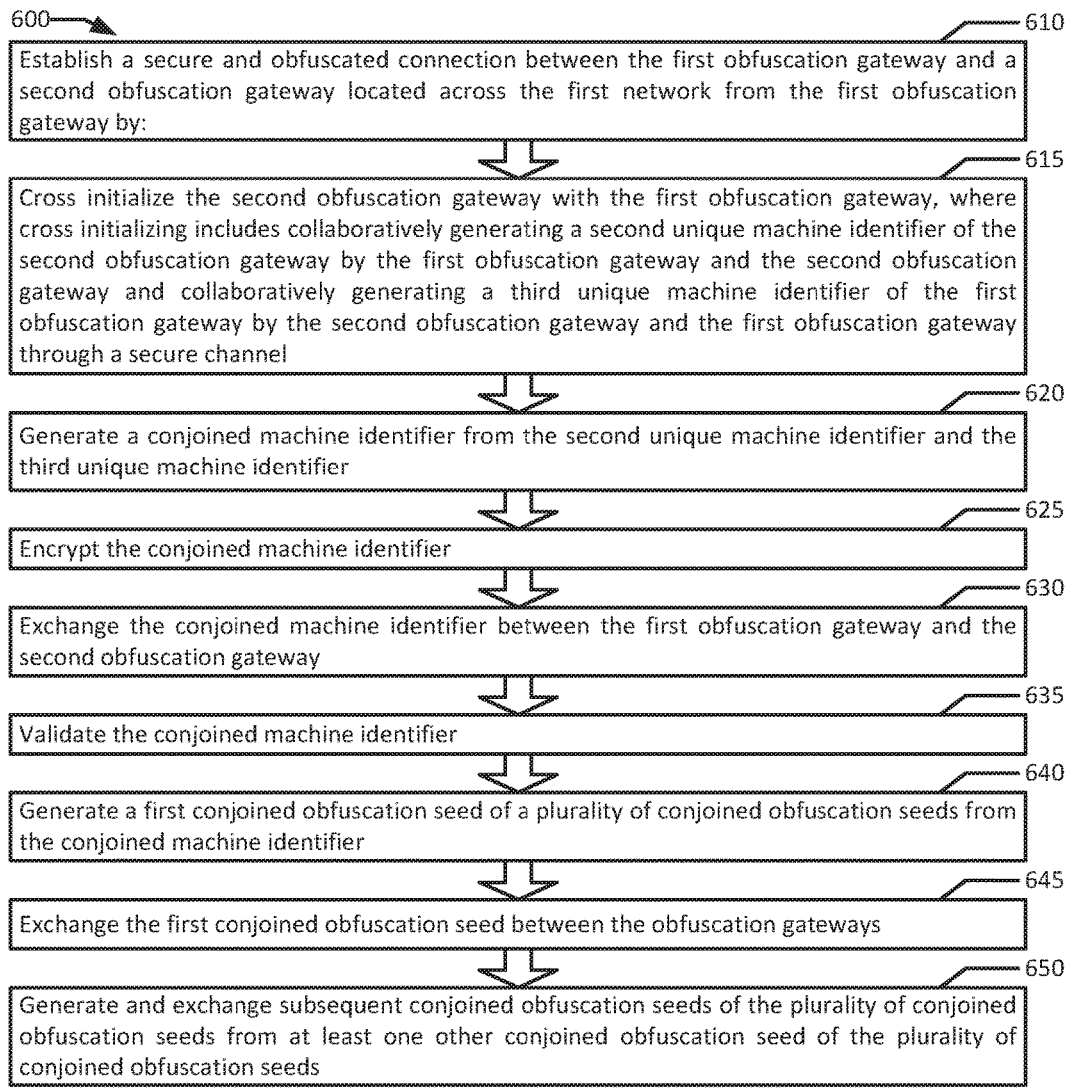
FIG. 6 is a flowchart illustrating an example of initializing two obfuscation gateways practicing network data obfuscation according to an example of the present disclosure.

FIG. 6 is a flowchart illustrating an example of initializing two obfuscation gateways practicing network data obfuscation according to an example of the present disclosure. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both. In an example, the method is performed by an obfuscation gateway 340 in communication with an obfuscation gateway 345.

The example method 600 may entail establishing a secure and obfuscated connection between the first obfuscation gateway and a second obfuscation gateway located across the first network from the first obfuscation gateway (block 610). For example, obfuscation gateway 340 may be an obfuscation gateway separating secured network 120 from unsecured network 115, and obfuscation gateway 345 may be an obfuscation gateway separating secured network 320 from unsecured network 115. In an example, for a gateway to driver connection (e.g., obfuscation gateway 140 to obfuscation driver 150), communications sessions may tend to originate from the obfuscation driver 150, and the endpoint device 145 is also the more likely device to be compromised. In such an example, revocation rights may be held by obfuscation gateway 140. In a gateway to gateway connection (e.g., obfuscation gateway 340 to obfuscation gateway 345), either side may start a communication session, and a given communication session is likely to be semi-permanent once established. However, it would also be relatively unwieldy to require initialization of large pieces of hardware like rack servers to be done on a local area secured network such as secured network 120.

In an example, the second obfuscation gateway is cross initialized with the first obfuscation gateway, where cross initializing includes collaboratively generating a second unique machine identifier of the second obfuscation gateway by the first obfuscation gateway and the second obfuscation gateway and collaboratively generating a third unique machine identifier of the first obfuscation gateway by the second obfuscation gateway and the first obfuscation gateway through a secure channel (block 615). For example, similar to the generation of unique machine identifier 146, unique machine identifiers 342 and 347 are generated collaboratively by the two systems that will be in communication with each other. Inputs in generating unique machine identifiers 342 and 347 may include system specific values (e.g., operating system identification number, computing device name, MAC address) and also synchronized global unique identifiers ("Guids"). In an example, specific values used to generate unique machine identifiers 342 and 347 may be stored on obfuscation gateways 340 and 345 in a permanent manner not erasable by an individual obfuscation gateway under normal operating conditions. In an example, the inputs for generating unique machine identifiers 342 and 347 are exchanged between obfuscation gateways 340 and 345 through a secure channel (e.g., quantum connection 380). In various other examples, the secure channel may be any communication channel known to be relatively secure, if not necessarily fast enough for bulk information exchange. Examples of secure channels may include an audio connection, an exchange of physical storage devices (e.g., flash drives), a pre-synchronization of the first obfuscation gateway and the second obfuscation gateway at a same location, a dedicated secure connection, and a quantum communication network. For example, a dedicated secure connection may be a custom wire connection between the two gateways, monitored for eavesdropping. In many cases, the secure channel may lack sufficient bandwidth for handling all of the transmissions between obfuscation gateway 340 and obfuscation gateway 345, in which case the secure channel may be used to secure transmissions through an unsecured network 115 (e.g., the internet) over standard fiber optic connections 370.

A conjoined machine identifier may be generated from the second unique machine identifier and the third unique machine identifier (block 620). For example, rather than using one system's unique machine identifier to initiate an obfuscation seed exchange for handshaking a secure and obfuscated communication session, a conjoined machine identifier 350 is first generated using both unique machine identifiers 342 and 347 as inputs. In an example, an agreed method of combination may be transmitted over quantum connection 380 (e.g., which unique machine identifier acts as a first input if order matters). In an example, the secure channel may also be used to pass an agreed encryption key or algorithm for encrypting the conjoined machine identifier 350. The conjoined machine identifier is then encrypted (block 625). The conjoined machine identifiers are exchanged between the first obfuscation gateway and the second obfuscation gateway (block 630). In an example, each obfuscation gateway (e.g., obfuscation gateways 340 and 345) transmits its copy of an encrypted conjoined machine identifier 340 to the other obfuscation gateway. A first conjoined obfuscation seed of a plurality of conjoined obfuscation seeds is generated from the conjoined machine identifier (block 640). In an example, either one or both obfuscation gateways 340 and 345 may generate a first conjoined obfuscation seed. The first conjoined obfuscation seed is exchanged between the obfuscation gateways (block 645). In an example, the first conjoined obfuscation seed may be generated by one obfuscation gateway 340 and validated by the other obfuscation gateway 345, or both obfuscation gateways 340 and 345, which then validate each other's generated conjoined obfuscation seed. In an example, the first conjoined obfuscation seed may also be transmitted over the secure channel. Subsequent conjoined obfuscation seeds of the plurality of conjoined obfuscation seeds are generated from at least one other conjoined obfuscation seed of the plurality of conjoined obfuscation seeds then exchanged (block 650). In an example, the obfuscation gateways 340 and 345 may continue to exchange conjoined obfuscation seeds, in addition to instructions for the generation of subsequent seeds, and the location of subsequent seeds within messages until a satisfactory level of complexity is reached. In an example, a conjoined obfuscation seed may be orders of magnitude larger than a normal obfuscation seed, similarly a conjoined machine identifier may be orders of magnitude larger than a typical user device's unique machine identifier for added security against brute force attacks.

In an example, so long as the secure and obfuscated connection between obfuscation gateways 340 and 345 is active, conjoined obfuscation seeds may continually be exchanged between the two obfuscation gateways 340 and 345, with decoy data being transmit instead of payload data as necessary. In an example, for an optimal balance of security and bandwidth, each transmission between obfuscation gateways 340 and 345 may be segmented into a plurality of transmission packets, and individual transmission packets of the plurality of transmission packets may be exchanged through different network routes between the obfuscation gateways 340 and 345. In an example, a given transmission may be split into ten packets, each sent over a different fiber optic connection with the exception of one packet sent over the secure channel. In an example, the packet sent over the secure channel may be a smaller packet than the ones sent over the fiber optic connections, but may include at least part of a current obfuscation seed and instructions for generating a subsequent obfuscation seed. In an example, each transmission between the obfuscation gateways 340 and 345 includes at least one conjoined obfuscation seed.

FIGS. 7A, 7B, 7C, 7D, and 7E are flow diagrams illustrating a network data obfuscation process according to an example of the present disclosure. Although the examples below are described with reference to the flow diagram illustrated in FIGS. 7A, 7B, 7C, 7D, and 7E, it will be appreciated that many other methods of performing the acts associated with FIGS. 7A, 7B, 7C, 7D, and 7E may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 700, an endpoint device 145 with an obfuscation driver 150 connects to an application 135 through an obfuscation gateway 140 to execute tasks with application 135.

Figure 7A:
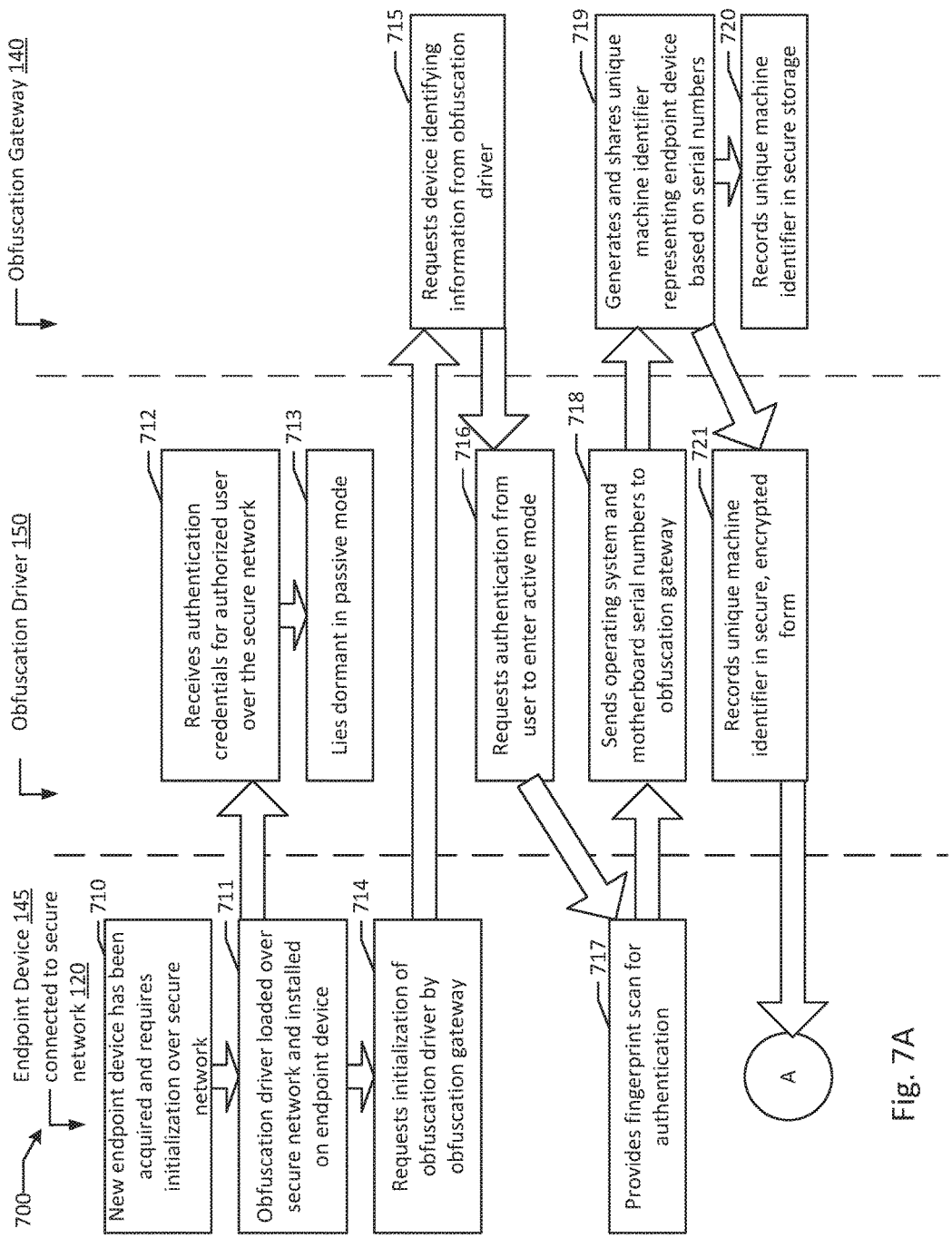
FIGS. 7A, 7B, 7C, 7D, and 7E are flow diagrams illustrating a network data obfuscation process according to an example of the present disclosure.

As illustrated in FIG. 7A, endpoint device 145 may be a new endpoint device that has been acquired for a new user and requires activation and initialization over secure network 120 (block 710). In an example, endpoint device 145 may be a new smart phone for a new worker that needs to be initialized before the new worker leaves the office (and therefore the secure network 120) to enable obfuscated communications. Obfuscation driver 150 may be loaded over secure network 120 and installed on endpoint device 145 (block 711). After being installed, obfuscation driver 150 may receive authentication credentials for an authorized user (e.g., the new worker) over the secure network 120 (block 712). In an example, obfuscation driver 150 may then lie dormant in passive mode (block 713). After installation of obfuscation driver 150 is complete on endpoint device 145, an administrator may request initialization of obfuscation driver 150 by obfuscation gateway 140 (block 714). In response to the request for initialization, obfuscation gateway 140 may request endpoint device 145 identifying information from obfuscation driver 150 (block 715). In an example, operating system identification number, computing device name, MAC address and various other identifying characteristics of endpoint device 145 may be requested to be stored in secure storage 130. In the example, obfuscation driver 150 is currently in passive mode, so obfuscation driver 150 requests authentication from an authorized user to enter active mode to provide the requested information (block 716). In an example, an administrator or the new worker may provide a fingerprint scan for biometric authentication (block 717). As a result of accepting the authentication credentials, obfuscation driver 150 enters active mode, and sends the serial numbers for the copy of the operating system loaded on endpoint device 145, and the motherboard of endpoint device 145 to obfuscation gateway 140 as inputs to generate a unique machine identifier (block 718). Obfuscation gateway 140 then generates a unique machine identifier 146 for endpoint device 145 based on the received serial numbers, and sends the unique machine identifier to obfuscation driver 150 (block 719). In an example, obfuscation gateway 140 records the unique machine identifier 146 for endpoint device 145 in non-volatile secure storage 130 (block 720). Obfuscation driver 150 also records the unique machine identifier 146 in non-volatile storage on endpoint device 145 in a secure, encrypted form (block 721).

Figure 7B:
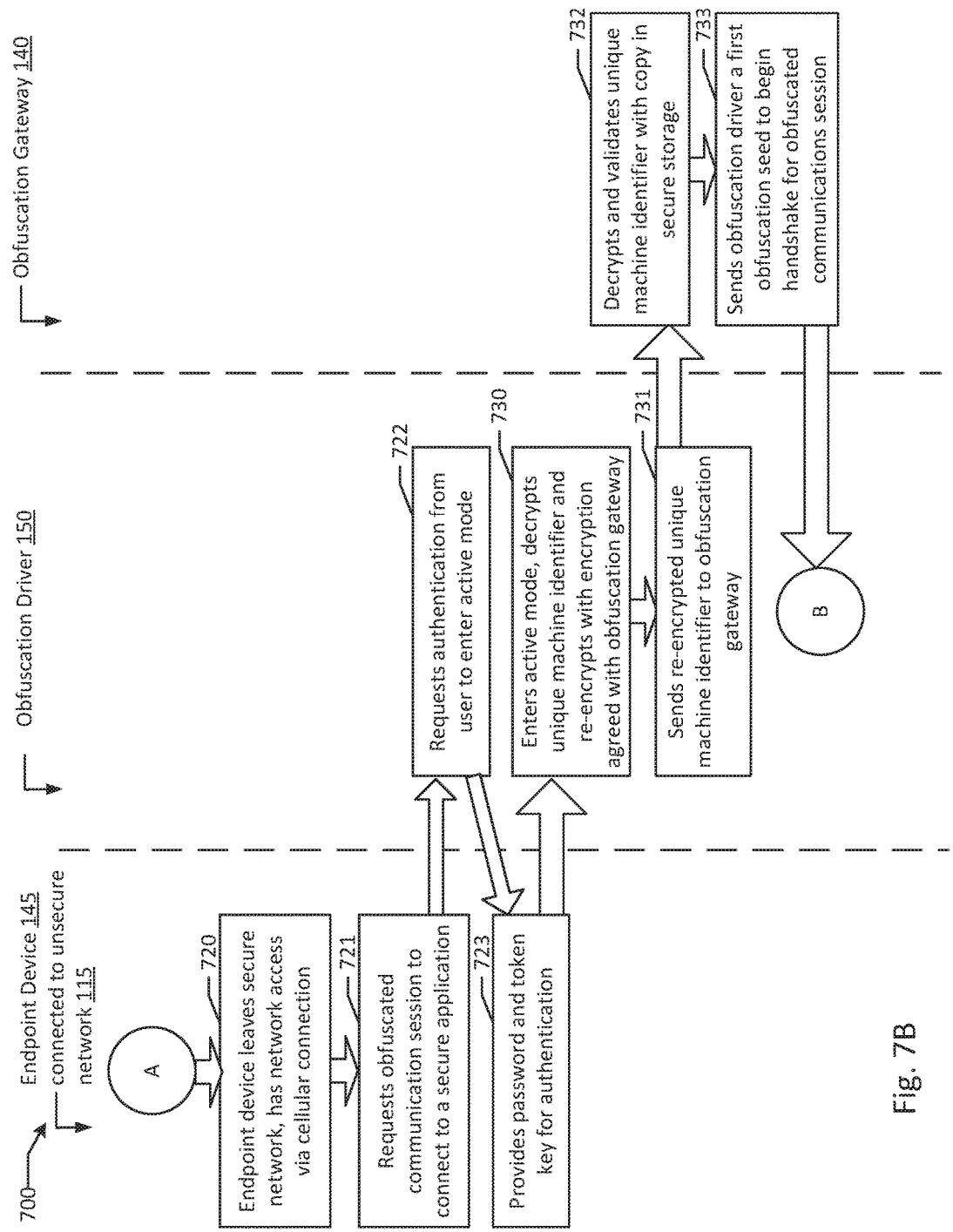

As illustrated in FIG. 7B, the new user takes the activated endpoint device 145 home for the day, resulting in endpoint device 145 no longer being within range to connect to secure network 120. In an example, upon leaving secure network 120, endpoint device 145 still has network access via an unsecured cellular connection to unsecured network 115 (block 720). In an example, endpoint device 145 requests an obfuscated communication session with obfuscation gateway 140 to connect to secure application 135 (block 721). For example, the new user may need some confidential client data (e.g., sales data, customer requests, customer identifying data, etc.) to prepare a presentation for the next day. Upon receiving the request, obfuscation driver 150 may request authentication from the user to enter active mode (block 722). In the example, the user may provide to endpoint device 145 a password and a token key for authentication (block 723). As a result of the successful authentication, obfuscation driver 150 may enter active mode, thereby decrypting unique machine identifier 146 in local storage, and re-encrypting unique machine identifier 146 with an encryption method agreed upon with obfuscation gateway 140 during initialization (block 730). In an example, obfuscation driver 150 sends the re-encrypted unique machine identifier 146 to obfuscation gateway 140 to initiate an obfuscated communication session handshake (block 731). Obfuscation gateway 140 may then decrypt and validate unique machine identifier 146 against the copy of unique machine identifier 146 stored in secure storage 130 (block 732). In an example, upon successful validation, obfuscation gateway 140 may send a first obfuscation seed to obfuscation driver 150 to begin the handshake process for an obfuscated communications session (block 733).

Figure 7C:
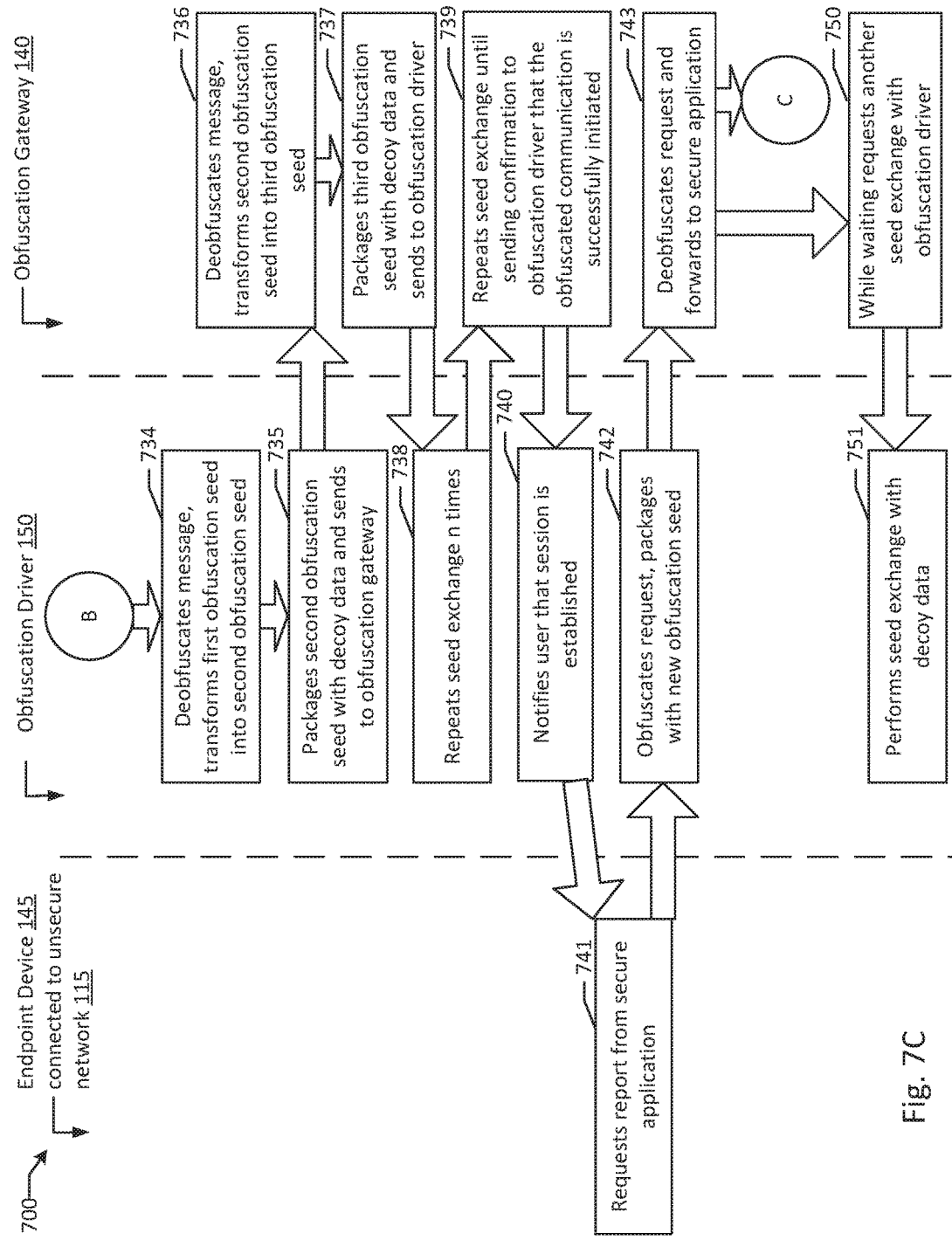

As illustrated in FIG. 7C, obfuscation driver 150 may then de-obfuscate the first handshake message from obfuscation gateway 140, and transform the first obfuscation seed into a second obfuscation seed to continue the handshake process (block 734). In an example, the transformation of the first obfuscation seed into the second obfuscation seed may include additional variables and/or instructions passed between obfuscation driver 150 and obfuscation gateway 140, both during initialization and during the handshake process. Obfuscation driver 150 then packages the second obfuscation seed with decoy data and sends the obfuscated message including second obfuscation seed and decoy data to obfuscation gateway 140 (block 735). In an example, obfuscation gateway 140 de-obfuscates the message from obfuscation driver 150, and transforms the second obfuscation seed into a third obfuscation seed (block 736). The third obfuscation seed is packaged with additional decoy data into a combined message sent back to the obfuscation driver 150 (block 737). Obfuscation driver 150 and obfuscation gateway 140 then repeat the obfuscation seed and decoy data exchange a number of times (block 738). In an example, obfuscation gateway 140 may continue repeating the seed exchange process with obfuscation driver 150 until a threshold is reached at which point obfuscation gateway 140 sends a confirmation to obfuscation driver 150 that the obfuscated communication session is successfully initiated (block 739). In an example, the threshold number of exchanges may be configurable and/or predetermined during initialization. Upon successful establishment of the obfuscated communication session, obfuscation driver 150 may notify the user of the endpoint device 145 (block 740). The user may then request a report to be delivered to the endpoint device 145 from secure application 135 over the newly established obfuscated communication session (block 741). Obfuscation driver 150 may obfuscate the request and package the request with a new obfuscation seed into a message, including reordering segments of the message transmitted to obfuscation gateway 140 (block 742). Obfuscation gateway 140 then de-obfuscates the request and forwards the request to secure application 135 (block 743). While awaiting a response from secure application 135, obfuscation gateway 140 may request another obfuscation seed exchange with obfuscation driver 150 (block 750). Obfuscation driver 150 may perform one or more additional obfuscation seed exchanges with obfuscation gateway 140 using decoy data while awaiting additional requests or responses to requests to keep the obfuscated communication session secure (block 751).

Figure 7D:
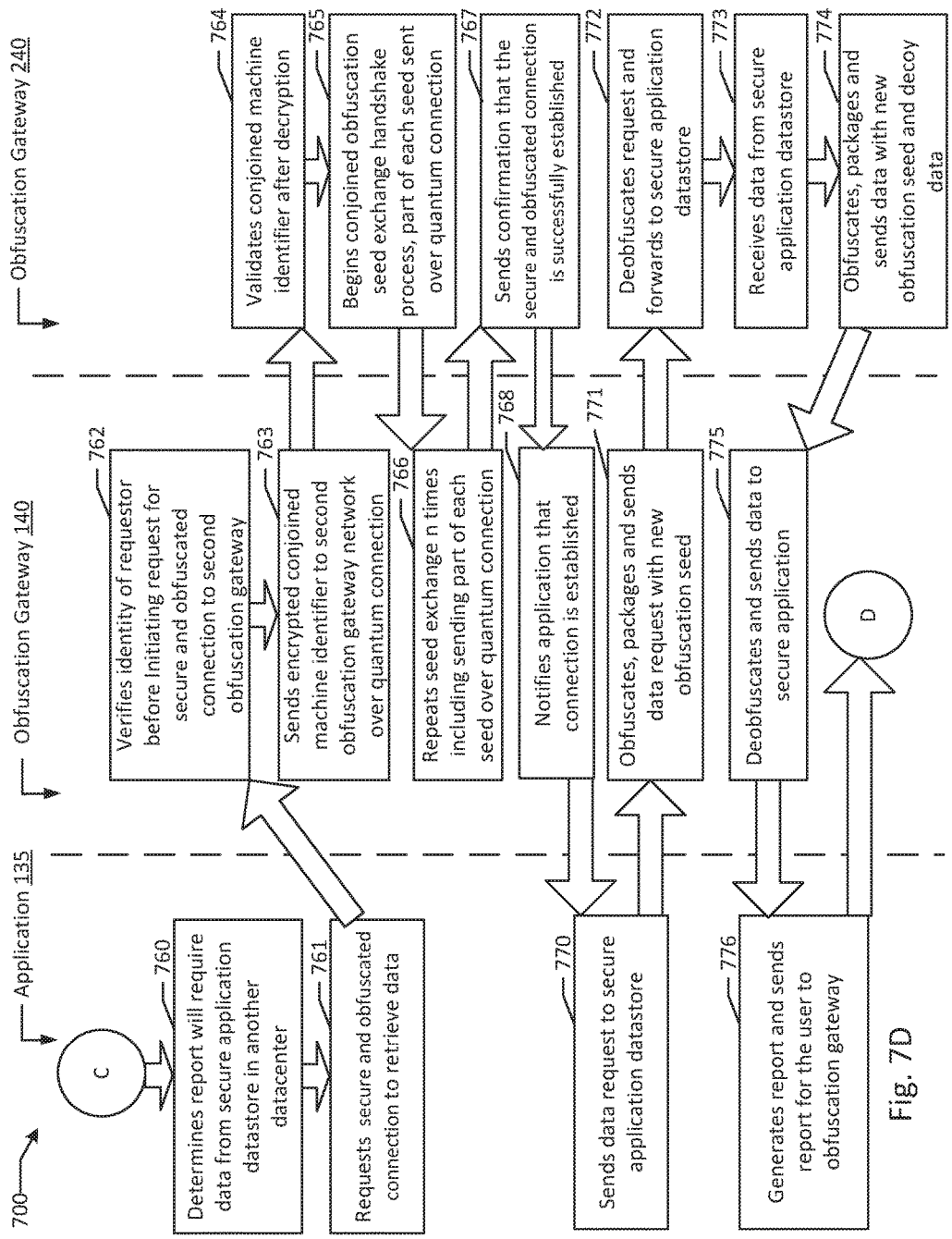

As illustrated in FIG. 7D, application 135, upon receiving the request, determines that the report will require data from secure application datastore 237 in another datacenter on secure network 220 (block 760). Application 135 then requests obfuscation gateway 140 to establish a secure and obfuscated connection with obfuscation gateway 240 to retrieve the required data (block 761). Obfuscation gateway 140 verifies the identity of the requestor (e.g., a service account with administrator privileges executing application 135) before initiating a request for a secure and obfuscated connection with obfuscation gateway 240 (block 762). In an example, a connection between obfuscation gateways 140 and 240 is pre-initialized, and currently lying dormant. In the example, obfuscation gateway 140 and obfuscation gateway 240 have already previously shared and validated conjoined machine identifiers. Obfuscation gateway 140 sends an encrypted conjoined machine identifier to obfuscation gateway 240 over a secure quantum connection (block 763). Obfuscation gateway 240 decrypts and validates the conjoined machine identifier (764). After successfully validating the conjoined machine identifier, obfuscation gateway 240 begins a conjoined obfuscation seed exchange handshake process to establish a new communication session with obfuscation gateway 140, including sending part of each seed in the conjoined obfuscation seed exchange being sent over the quantum connection for added security (block 240). Obfuscation gateway 140 then continues repeating the conjoined obfuscation seed exchange process with obfuscation gateway 240 until a threshold is reached at which point obfuscation gateway 240 sends a confirmation to obfuscation gateway 140 that the communication session is successfully initiated (block 766). After the security threshold is reached, obfuscation gateway 240 sends a confirmation that the secure and obfuscated connection is successfully established (block 767). Obfuscation gateway 140 then notifies application 135 that the connection is established (block 768). Application 135 sends the data request to secure application datastore 237 (block 770). Obfuscation gateway 140 intercepts the data request, obfuscates, packages the data request with a new conjoined obfuscation seed and decoy data, and sends the obfuscated data request to obfuscation gateway 240 (block 771). In an example, obfuscation gateway 240 de-obfuscates the data request and forwards the data request to secure application datastore 237 (block 772). Obfuscation gateway 240 then receives the requested data from secure application datastore 237 (block 773). Obfuscation gateway 240 obfuscates the requested data, packages the data with a new conjoined obfuscation seed and decoy data, and sends the obfuscated data to obfuscation gateway 140 (block 774). Upon receipt, obfuscation gateway 140 then de-obfuscates the data and sends the data to secure application 135 (block 775). Application 135 then generates the requested report with the received data, and sends the report for the user to obfuscation gateway 140 (block 776).

Figure 7E:
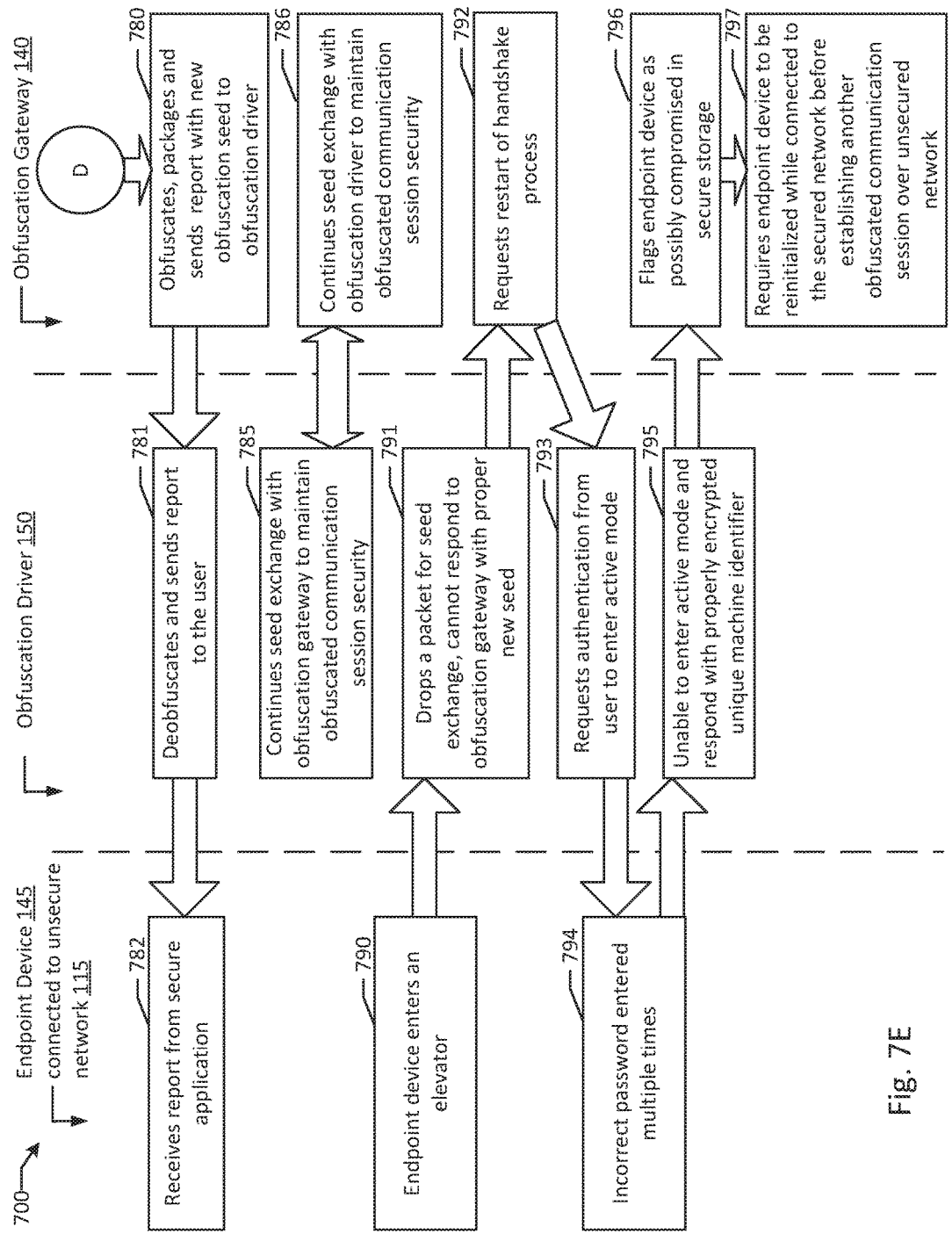

As illustrated in FIG. 7E, obfuscation gateway, having received the report, obfuscates the report, and packages the report with a new obfuscation seed to send to obfuscation driver 150 (block 780). Obfuscation driver 150 then de-obfuscates the report and sends the report to the user (block 781). In an example, the user receives the report from secure application 135 in a graphical user interface for application 135 on endpoint device 145 (block 782). In an example, while the user is reviewing the report, obfuscation gateway 140 and obfuscation driver 150 continue to exchange obfuscation seeds to maintain the security of the established obfuscated communication session (blocks 785 and 786). During an exchange of obfuscation seeds, the user steps into an elevator, causing the endpoint device 145 in the elevator to momentarily lose cellular signal (block 790). Due to a dropped packet in the obfuscation seed exchange, obfuscation driver 150 cannot respond to obfuscation gateway 140 with a proper new seed to maintain the obfuscated communication session (block 791). Obfuscation gateway 140 then requests a restart of the handshake process (block 792). Having lost its connection with obfuscation gateway 140, obfuscation driver 150 may have returned to passive mode. Obfuscation driver 150 may request authentication from the user to enter active mode in response to the request to restart the handshake process (block 793). An incorrect password may be entered into endpoint device 145 multiple times (block 794). In an example, the user's toddler may have found the endpoint device 145 and entered the wrong password. Due to the failed authentications, obfuscation driver 150 is unable to enter active mode and to respond to obfuscation gateway 140 with a properly encrypted unique machine identifier 146 (block 795). As a result of the lack of response from obfuscation driver 150, obfuscation gateway 140 may flag endpoint device 145 as possibly compromised in secure storage 130 (block 796). Due to the flag as possibly compromised, obfuscation gateway 140 requires endpoint device 145 to be reinitialized while connected to secure network 120 before allowing endpoint device 145 and obfuscation driver 150 to establish another obfuscated communication session over unsecured network 115 (block 797). In another example, endpoint device 145 may have its initialization placed on hold, and the hold may be removed responsive to a higher level of authentication than password authentication (e.g., a biometric scan or a multi factor authentication). For example, the user may be required to call a helpdesk, identify themselves, and input an override code provided by the help desk into endpoint device 145.

Figure 8:
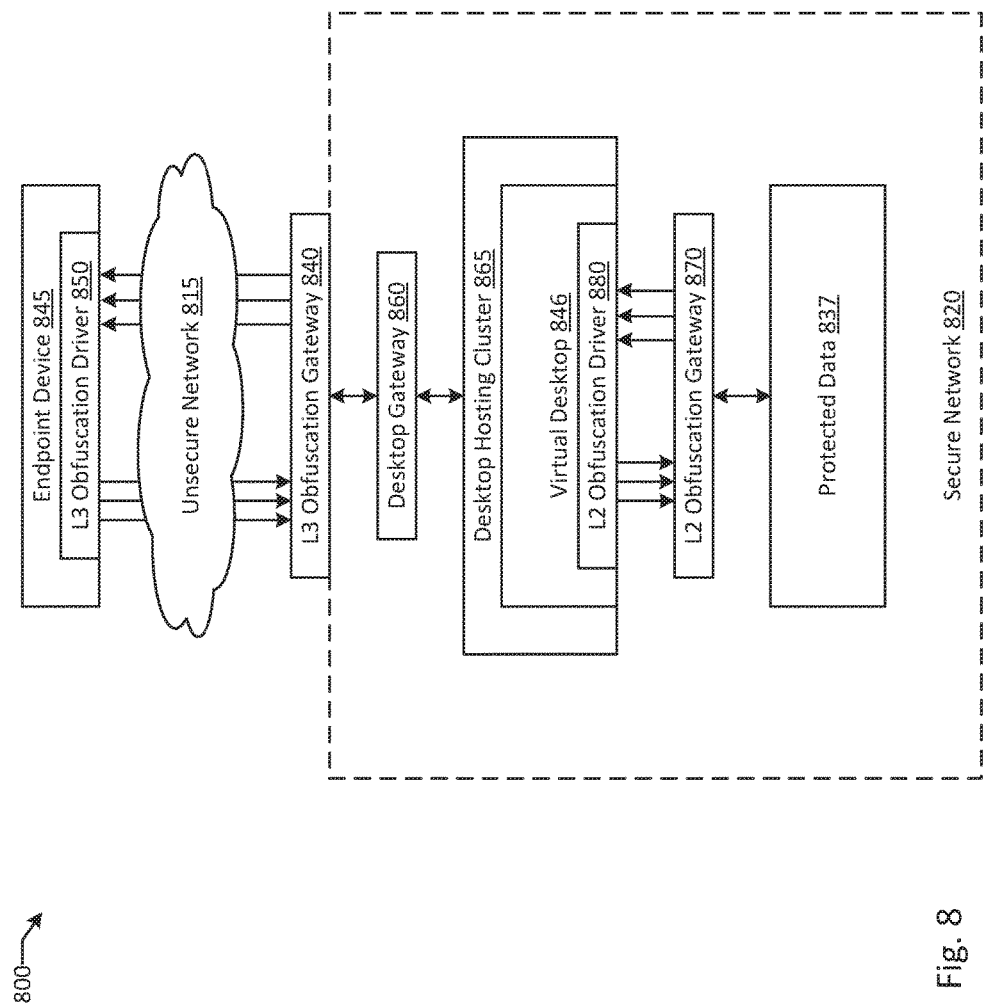
FIG. 8 is a block diagram illustrating a network data obfuscation system according to an example of the present disclosure.

FIG. 8 is a block diagram illustrating a network data obfuscation system according to an example of the present disclosure. System 800 as illustrated in FIG. 8 shows network data obfuscation being used to secure network traffic in a remote access or working from home scenario. In an example, endpoint device 845 may be a laptop computer loaded with obfuscation driver 850. In the example, L3 obfuscation driver 850 is configured to obfuscate L3 ("Network Layer") communications (e.g., internet protocol packets in a TCP/IP connection). L3 obfuscation driver 850 may be connected to L3 obfuscation gateway 840 with an encrypted internet connection over unsecured network 815 (e.g., the internet). In the example, L3 obfuscation gateway 840 may be a part of a gateway system between secure network 820 and unsecure network 815. In an example, L3 obfuscation driver 850 and L3 obfuscation gateway 840 may establish an obfuscated communication session using a previously collaboratively generated unique machine identifier for endpoint device 845 to secure communications between endpoint device 845 and secure network 820.

In an example, a user of endpoint device 845 has a virtual desktop 846 assigned for the user's use. Virtual desktop 846 may be a virtual machine hosted on desktop hosting cluster 865. In an example, in order to access virtual desktop 846, the user may typically first authenticate with desktop gateway 860 to be routed to virtual desktop 846 rather than any other virtual desktop in desktop hosting cluster 865. In an example, L3 obfuscation gateway 840 may execute in what is typically referred to as a demilitarized zone ("DMZ") environment of secure network 820, with desktop gateway 860 facing both the DMZ portion of secure network 820 and the local area network ("LAN") portion of secure network 820.

In an example, some of the data required by applications executing on virtual desktop 846 may reside in a more highly secured storage cluster within secure network 820, for example, a storage cluster for protected data 837 (e.g., employee records, client records, financial data, medical records, trade secrets, etc.). In the example, access to protected data 837 may require additional logging for maintenance of an audit trail. In such a scenario, access to protected data 837 may be funneled through a single access point for better logging (e.g., L2 obfuscation gateway 870). In the example, virtual desktop 846 may execute a L2 obfuscation driver 880 configured to obfuscate L2 ("Data Link Layer") communications within a local area network (e.g., connectionless, broadcast based messaging of frames). In an example, by adding an obfuscated communication session between virtual desktop 846 and protected data 837, what may normally be broadcast based L2 communications between virtual desktop 846 and protected data 837 may then be made private as any broadcast data from protected data 837 would only be decipherable to virtual desktop 846 at the other end of an obfuscated communications session between L2 obfuscation driver 880 and L2 obfuscation gateway 870. In an example, by adding the obfuscated communication session, a much improved audit trail may be kept regarding access to protected data 837.

Figure 9A:
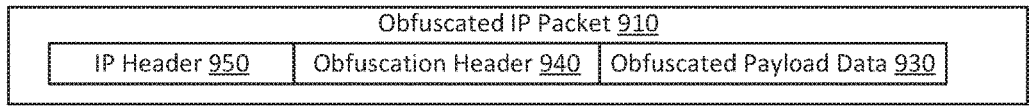
FIG. 9A is a block diagram illustrating an example obfuscated message packet 910 from a network data obfuscation system according to an example of the present disclosure.

FIG. 9A is a block diagram illustrating an example obfuscated message packet 910 from a network data obfuscation system according to an example of the present disclosure. More specifically, FIG. 9A illustrates an example obfuscated internet protocol packet 910. For example, obfuscated internet protocol packet 910 may include an internet protocol header 950, an obfuscation header 940, and an obfuscated payload data 930.

Figure 9B:
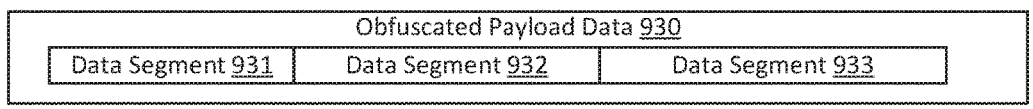
FIG. 9B is a block diagram illustrating an expanded view of an example obfuscated payload data 930 illustrated in FIG. 9A according to an example of the present disclosure.

FIG. 9B is a block diagram illustrating an expanded view of an example obfuscated payload data 930 illustrated in FIG. 9A according to an example of the present disclosure. In a typical example, as illustrated in FIG. 9B, obfuscated payload data 930 may include a plurality of data segments (e.g., data segments 931, 932, and 933) which may be reordered from their proper alignment based on obfuscation instructions (e.g., instructions included in obfuscation header 940). In various examples, obfuscation header 940 may be split into segments and interspersed throughout obfuscated IP packet 910 for added security. In an example, a previous obfuscated IP packet may include instructions for locating the obfuscation header 940 in obfuscated IP packet 910. In an example, obfuscation header 940 may additionally include an obfuscation seed. In an example, IP header 950 may be appended to obfuscation header 940 and obfuscated payload data 930 to form an "envelope," the contents of which are delivered "as is" to an obfuscation gateway or obfuscation driver. In an example, an obfuscation gateway may first reorder data segments 931, 932, and 933 based on obfuscation instructions in obfuscation header 940, then insert obfuscation header 940 in one or more pieces into the data block of reordered data segments (e.g., obfuscated payload data 930). The combined obfuscation header 940 and obfuscated payload data 930 may then be wrapped with IP header 950. In the example, IP header 950 may be configured to route the complete obfuscated IP packet 910 to a recipient of the packet (e.g., another obfuscation gateway or obfuscation driver).

In an example, an application may already have wrapped a message in an IP envelope before the message is intercepted by an obfuscation gateway or obfuscation driver. In such an example, the contents of the IP envelope may already be encrypted before being obfuscated and reordered based on de-obfuscation instructions in an obfuscation header added by the obfuscation gateway or obfuscation driver. In such examples, while obfuscated, the pre-encrypted data may not be decrypted into sensible data. The obfuscation gateway or obfuscation driver may then wrap the obfuscated message in another IP envelope directed to its corresponding obfuscation gateway or obfuscation driver, instead of to, for example, an application server.

Figure 9C:
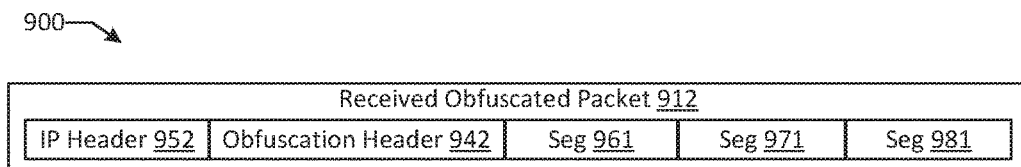
FIG. 9C is a block diagram illustrating system 900 de-obfuscating payload data from several messages and stitching various message segments together to recreate non-obfuscated messages according to an example of the present disclosure.
Figure 9C:
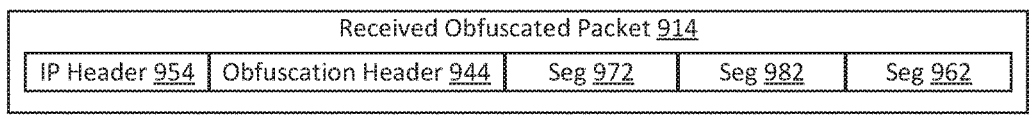
Figure 9C:
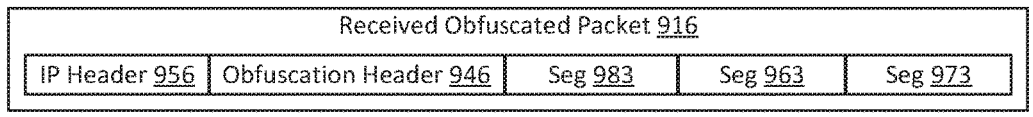
Figure 9C:
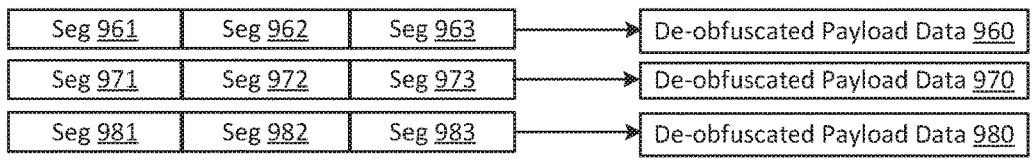

FIG. 9C is a block diagram illustrating system 900 de-obfuscating payload data from several messages and stitching various message segments together to recreate non-obfuscated messages according to an example of the present disclosure. In an example, multiple messages (or decoy messages) may be sent from an obfuscation gateway to an obfuscation driver in a relatively short time frame. System 900 illustrates a example receipt of three obfuscated packets (e.g., received obfuscated packets 912, 914 and 916) by an obfuscation driver or obfuscation gateway. In the example, received obfuscated packet 912 includes IP header 952, obfuscation header 942, and data segments 961, 971, and 981. Received obfuscated packet 914 includes IP header 954, obfuscation header 944, and data segments 972, 982, and 962. Received obfuscated packet 916 includes IP header 956, obfuscation header 946, and data segments 983, 963, and 973. In an example, data segments from three separate messages have each been packaged with data segments from the other messages in obfuscated packets 912, 914, and 916. In an example, upon receipt by an obfuscation driver or obfuscation gateway, the IP headers 952, 954 and 956 are first stripped off the packets 912, 914, and 916. In an example, each data segment in each packet 912, 914, and 916 is then identified based on obfuscation headers 942, 944, and 946. In an example, data from previous packets is required to decipher obfuscation headers 942, 944, and 946. After identifying the various data segments in obfuscated packets 912, 914, and 916, the obfuscation driver or obfuscation gateway may then de-obfuscate the messages. For example, the obfuscation driver or obfuscation gateway may stitch together data segments 961, 962, and 963 to form de-obfuscated payload data 960, data segments 971, 972, and 973 to form de-obfuscated payload data 970, and data segments 981, 982, and 983 to form de-obfuscated payload data 980.

Figure 9D:
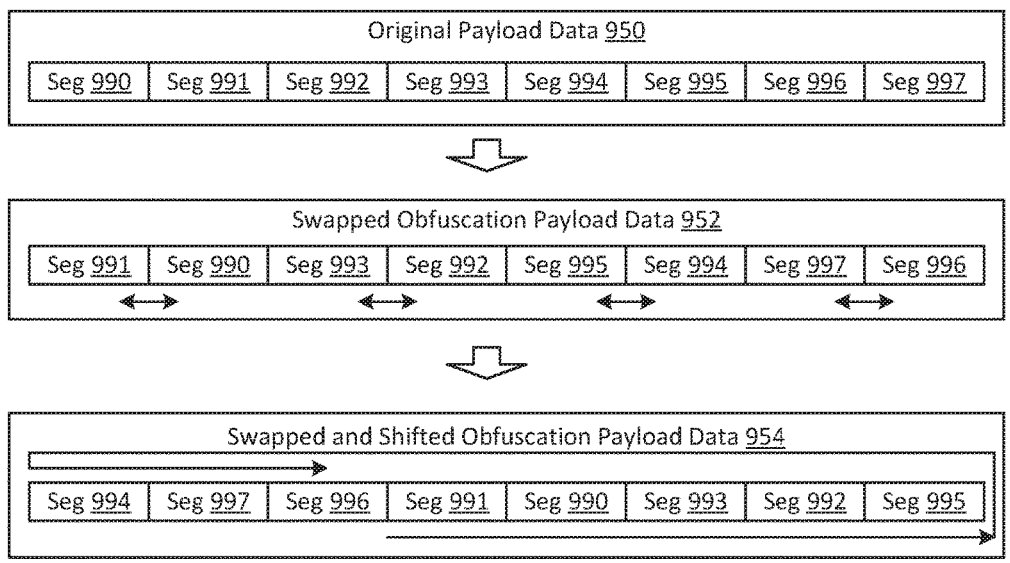
FIG. 9D is a block diagram illustrating system 901 obfuscating a message through reordering message segments according to an example of the present disclosure.

FIG. 9D is a block diagram illustrating system 901 obfuscating a message through reordering message segments according to an example of the present disclosure. More specifically, system 901 as illustrated in FIG. 9D shows three sequential steps taken to obfuscate payload data in a system practicing an example embodiment of network data obfuscation. The steps may be performed in reverse (e.g., as indicated in de-obfuscation instructions) to de-obfuscate the payload data when the message reaches its destination. In an example, original payload data 950 may include data segments 990, 991, 992, 993, 994, 995, 996, and 997 sequentially. A first obfuscation instruction may instruct an obfuscation gateway or obfuscation driver to swap every other data segment in original payload data 950, resulting in swapped obfuscation payload data 952, with data segments reordered to data segment 991, data segment 990, data segment 993, data segment 992, data segment 995, data segment 994, data segment 997, and data segment 996. In an example, swapped obfuscation payload data 952 may be further reordered to yield swapped and shifted obfuscation payload data 954, where each data segment is shifted down in line three spots. In the example, swapped and shifted obfuscation payload data 954 may have data segments reordered to data segment 994, data segment 997, data segment 996, data segment 991, data segment 990, data segment 993, data segment 992, and data segment 995. In various examples, each message in an obfuscated communication session may be reordered a plurality of times based on security needs. In an example, reordering data segments is much faster than encrypting and decrypting a similar amount of data. Due to requiring significantly less processor time for calculations, reordering data segments for obfuscation on already encrypted data may provide similar heightened security to adding one or more additional layers of encryption on a given message payload without incurring the processor load and latency of adding the additional layers of encryption.

In an example, at each obfuscation gateway and obfuscation driver, an incoming message queue and an outgoing message queue may be implemented to improve security. For example, outgoing messages may be sent in bursts, so that several messages may be collected and mixed together to increase the level of obfuscation of each message (e.g., as illustrated in FIG. 9C). In an example, message packets may be transmit through different network paths including potentially one or more secured channels with lower bandwidth. In such an example, packets may likely be received out of order and therefore a complete message may only be assembled after each component packet is received in a queue. In various other examples, obfuscation may be achieved other than by reordering message segments. For example, a limited reversible cipher may be used alone or in conjunction with reordering. In such an example, each "A" in a message may be replaced with a "E" and vice versa for a relatively streamlined means of defeating decryption attempts that utilize brute force or even where private keys may be compromised. In an example, the smaller the size of each message segment a message is divided into prior to obfuscation, the more computing intensive the obfuscation process will be, but smaller message segments may also yield more obfuscated results, and therefore stronger security.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
an endpoint device connected to a first network, wherein the endpoint device includes a first obfuscation driver and the first obfuscation driver is in one of two states, an uninitialized state and an initialized state, and the initialized state has an active mode and a passive mode;
one or more processors connected to the first network, wherein a first obfuscation gateway executes on the one or more processors to:
initialize the first obfuscation driver operating in the active mode while the endpoint device is connected to the obfuscation gateway with a secure connection, wherein initializing the first obfuscation driver includes collaboratively generating a first unique machine identifier of the endpoint device by the first obfuscation driver and the first obfuscation gateway over the secure connection;
establish a first obfuscated communication session with the first obfuscation driver operating in the active mode;
receive, from the first obfuscation driver, a first obfuscated message of the first obfuscated communication session, wherein the first obfuscated message includes a first obfuscation seed and a first message payload, the first obfuscated message is received from the first endpoint device over the first network, and the first obfuscated message is received as a first plurality of message segments, the first plurality of message segments being reordered prior to transmission;
receive, from the first obfuscation driver, first de-obfuscation instructions associated with the first obfuscated message;
de-obfuscate the first obfuscated message, including reordering the first plurality of message segments based on the first de-obfuscation instructions resulting in a first de-obfuscated message;

forward the first de-obfuscated message to an application;
receive, from the application, a first response message including a second message payload;
create second de-obfuscation instructions associated with the first response message;
generate a second obfuscation seed from at least part of the first obfuscation seed;
send the second obfuscation seed to the first obfuscation driver;
receive, from the first obfuscation driver, a third obfuscation seed;
obfuscate the first response message by reordering a second plurality of message segments of the first response message based on the second de-obfuscation instructions resulting in a first obfuscated response message;
send, to the first obfuscation driver, the second de-obfuscation instructions and the first obfuscated response message, wherein the third obfuscation seed is included in the first obfuscated response message;
receive, from the first obfuscation driver, a second obfuscated message of the first obfuscated communication session, wherein the second obfuscated message includes a fourth obfuscation seed and a third message payload, the second obfuscated message is received from the first endpoint device over the first network, and the second obfuscated message is received as a third plurality of message segments, the third plurality of message segments being reordered prior to transmission;
receive, from the first obfuscation driver, third de-obfuscation instructions associated with the second obfuscated message; and
de-obfuscate the second obfuscated message, including reordering the third plurality of message segments based on the third de-obfuscation instructions resulting in a second de-obfuscated message.

2. The system of claim 1, wherein establishing the first obfuscated communication session with the first obfuscation driver further comprises the first obfuscation gateway executing to:
receive a request from the endpoint device to initiate the first obfuscated communication session, wherein the request includes a first encrypted unique machine identifier generated by the first obfuscation driver from the first unique machine identifier;
decrypt the first encrypted unique machine identifier resulting in a second unique machine identifier;
verify that the second unique machine identifier matches the first unique machine identifier generated during the initialization of the first obfuscation driver;
responsive to verifying that the second unique machine identifier matches the first unique machine identifier, generate a fifth obfuscation seed from the first unique machine identifier;
send a first handshake message including the fifth obfuscation seed to the first obfuscation driver;
receive from the first obfuscation driver a sixth obfuscation seed in a second handshake message;
verify an authenticity of the sixth obfuscation seed;
responsive to verifying the authenticity of the sixth obfuscation seed, generate a seventh obfuscation seed from at least one of the fifth obfuscation seed and the sixth obfuscation seed;
send a third handshake message including the seventh obfuscation seed to the first obfuscation driver;
receive from the first obfuscation driver an eighth obfuscation seed in a fourth handshake message;
verify an authenticity of the eighth obfuscation seed; and
send a fifth handshake message including at least a ninth obfuscation seed to the first obfuscation driver, wherein the fifth handshake message acknowledges a successful initiation of the first obfuscated communication session.

3. The system of claim 2, wherein any failed verification by the first obfuscation gateway of any obfuscation seed sent by the first obfuscation driver results in a termination of the first obfuscated communication session.

4. The system of claim 3, wherein the first obfuscation driver is prevented from establishing any further obfuscated communication sessions with the first obfuscation gateway as a result of a failed verification.

5. The system of claim 3, wherein the first obfuscation driver is re-initialized on the secure connection to re-enable an obfuscated communication session establishment privilege of the first obfuscation driver.

6. The system of claim 1, wherein the first obfuscation driver defaults to the passive mode, wherein the first obfuscation driver in the passive mode ignores a network traffic of the endpoint device and the first obfuscation driver in the active mode intercepts the network traffic of the endpoint device.

7. The system of claim 6, wherein the first obfuscation driver enters the active mode responsive to a successful authentication, and the first obfuscation driver is required to be in the active mode to encrypt the first unique machine identifier.

8. The system of claim 7, wherein the successful authentication includes at least one of a biometric scan, a password verification, a token verification, and a cellular network verification.

9. The system of claim 1, wherein each obfuscation seed includes generation instructions for a next obfuscation seed.

10. The system of claim 9, wherein a stream of obfuscation seeds are continually passed between the first obfuscation gateway and the first obfuscation driver based on at least one of a time elapsed and a message count, regardless of whether any payload data being ready to be transmitted between the endpoint device and the application.

11. The system of claim 10, wherein the stream of obfuscation seeds are transmitted with decoy data.

12. The system of claim 1, wherein the first obfuscation gateway remotely updates the first obfuscation driver.

13. The system of claim 12, wherein updating the first obfuscation driver enables different types of obfuscation instructions to be generated.

14. The system of claim 1, wherein the first plurality of message segments and are transmitted in a first plurality of packets.

15. The system of claim 14, wherein a fourth plurality of message segments are interspersed with the first plurality of segments in the first plurality of packets during transmission.

16. The system of claim 15, wherein the fourth plurality of message segments are comprised of decoy data.

17. The system of claim 15, wherein the fourth plurality of message segments are segments of a third obfuscated message.

18. The system of claim 14, wherein each packet of the first plurality of packets includes an internet protocol header, an obfuscation header, and a payload of obfuscated data.

19. The system of claim 18, wherein the obfuscation header includes at least a portion of the first de-obfuscation instructions.

20. The system of claim 18, wherein at least one of a location of the first obfuscation seed and a location of an obfuscation header of the first obfuscated message in the first obfuscated message is different from at least one of a location of the fourth obfuscation seed and a location of an obfuscation header of the second obfuscated message in the second obfuscated message.

21. The system of claim 20, wherein the first response message includes instructions for locating the location of the fourth obfuscation seed and the location of the obfuscation header of the second obfuscated message in the second obfuscated message.

22. The system of claim 1, wherein the first obfuscated message is encrypted prior to being obfuscated.

23. The system of claim 1, wherein the first obfuscation driver is retrofit onto the endpoint device and the first obfuscation gateway is retrofit onto an existing application server.

24. The system of claim 23, wherein a same version of the application executes identically both prior to and after retrofitting the first obfuscation driver onto the endpoint device and the first obfuscation gateway onto the existing application server.

25. The system of claim 1, wherein the first network is an unsecure network.

26. The system of claim 1, wherein the application requires protected data located across a second network.

27. The system of claim 26, wherein the second network is a secure network.

28. The system of claim 26, wherein the application sends a data request to a protected data storage and receives a data response from the protected data storage.

29. The system of claim 28, wherein the data request is logged into a memory and reported to an administrator.

30. The system of claim 28, wherein the data request is intercepted by a second obfuscation gateway and the second obfuscation gateway executes to:
  establish a second obfuscated communication session with a second obfuscation driver;
  obfuscate the data request resulting in a third obfuscated message and fourth de-obfuscation instructions;
  transmit the third obfuscated message and fourth de-obfuscation instructions to the second obfuscation driver executing on the protected data storage; and
  receive, from the second obfuscation driver a fourth obfuscated message and fifth de-obfuscation instructions.

31. The system of claim 1, wherein the first obfuscation gateway flags the endpoint device as an intruder responsive to at least one of a failure to establish the first obfuscated communication session and a failure in a validation of any obfuscation seed.

32. The system of claim 1, further comprising:
  a second obfuscation gateway located across the first network from the first obfuscation gateway, wherein the first network is an unsecured network and the second obfuscation gateway executes to:
  establish a secure and obfuscated connection with the first obfuscation gateway over the first network by:
  cross initializing with the first obfuscation gateway, wherein cross initializing with the first obfuscation gateway includes collaboratively generating a second unique machine identifier of the second obfuscation gateway by the first obfuscation gateway and the second obfuscation gateway and collaboratively generating a third unique machine identifier of the first obfuscation gateway by the second obfuscation gateway and the first obfuscation gateway through a secure channel;
  generating a conjoined machine identifier from the second unique machine identifier and the third unique machine identifier;
  encrypting the conjoined machine identifier;
  exchanging the conjoined machine identifier with the first obfuscation gateway;
  validating the conjoined machine identifier;
  generating a first conjoined obfuscation seed of a plurality of conjoined obfuscation seeds from the conjoined machine identifier;
  exchanging the first conjoined obfuscation seed between the obfuscation gateways; and
  generating and exchanging subsequent conjoined obfuscation seeds of the plurality of conjoined obfuscation seeds from at least one other conjoined obfuscation seed of the plurality of conjoined obfuscation seeds.

33. The system of claim 32, wherein the first obfuscation gateway separates a first plurality of computer systems connected to a first secure network from the first network, and the second obfuscation gateway separates a second plurality of computer systems connected to a second secure network from the first network.

34. The system of claim 32, wherein the first obfuscation gateway and the second obfuscation gateway continuously exchange and validate conjoined obfuscation seeds to maintain a security of the secure and obfuscated connection.

35. The system of claim 32, wherein each transmission between the first obfuscation gateway and the second obfuscation gateway is segmented into a plurality of transmission packets, and individual transmission packets of the plurality of transmission packets are exchanged through different network routes of a plurality of network routes between the first obfuscation gateway and the second obfuscation gateway.

36. The system of claim 35, wherein each transmission between the first obfuscation gateway and the second obfuscation gateway includes at least one conjoined obfuscation seed.

37. The system of claim 36, wherein at least part of each transmission between the first obfuscation gateway and the second obfuscation gateway is transmitted over the secure channel.

38. The system of claim 32, wherein the secure channel includes at least one of an audio connection, an exchange of physical storage devices, a pre-synchronization of the first obfuscation gateway and the second obfuscation gateway at a same location, a dedicated secure connection, and a quantum communication network.

39. The system of claim 37, wherein the secure channel lacks sufficient bandwidth for handling all of the transmissions between the first obfuscation gateway and the second obfuscation gateway.

40. The system of claim 1, wherein the secure connection includes a wireless component.

41. The system of claim 40, wherein the wireless component is one of a near-field communications connection, a short wave-length radio connection, and a Wi-Fi connection.

42. The system of claim 1, wherein the secure connection is an encrypted internet connection with an authentication requirement.

43. The system of claim 42, wherein the first unique machine identifier is generated by the first obfuscation driver with instructions from the first obfuscation gateway, the instructions from the first obfuscation gateway being sent to the first obfuscation driver in response to successful authentication over the encrypted internet connection.

44. A method comprising:
   initializing a first obfuscation driver included in an endpoint device connected to a first network, wherein the first obfuscation driver is in one of two states, an uninitialized state and an initialized state, and the initialized state has an active mode and a passive mode, and wherein the first obfuscation driver is operating in the active mode while the endpoint device is connected to a first obfuscation gateway with a secure connection, and wherein initializing the first obfuscation driver includes collaboratively generating a first unique machine identifier of the endpoint device by the first obfuscation driver and the first obfuscation gateway over the secure connection;
   establishing a first obfuscated communication session between the first obfuscation driver operating in the active mode, and the first obfuscation gateway;
   receiving, by the first obfuscation gateway, from the first obfuscation driver, a first obfuscated message of the first obfuscated communication session, wherein the first obfuscated message includes a first obfuscation seed and a first message payload, the first obfuscated message is received from the first endpoint device over the first network, and the first obfuscated message is received as a first plurality of message segments, the first plurality of message segments being reordered prior to transmission;
   receiving, from the first obfuscation driver, first de-obfuscation instructions associated with the first obfuscated message;
   de-obfuscating the first obfuscated message, including reordering the first plurality of message segments based on the first de-obfuscation instructions resulting in a first de-obfuscated message;
   forwarding the first de-obfuscated message to an application;
   receiving, from the application, a first response message including a second message payload;
   creating second de-obfuscation instructions associated with the first response message;
   generating a second obfuscation seed from at least part of the first obfuscation seed;
   sending the second obfuscation seed to the first obfuscation driver;
   receiving, from the first obfuscation driver, a third obfuscation seed;
   obfuscating the first response message by reordering a second plurality of message segments of the first response message based on the second de-obfuscation instructions resulting in a first obfuscated response message;
   sending, to the first obfuscation driver, the second de-obfuscation instructions and the first obfuscated response message, wherein the third obfuscation seed is included in the first obfuscated response message;
   receiving, from the first obfuscation driver, a second obfuscated message of the first obfuscated communication session, wherein the second obfuscated message includes a fourth obfuscation seed and a third message payload, the second obfuscated message is received from the first endpoint device over the first network, and the second obfuscated message is received as a third plurality of message segments, the third plurality of message segments being reordered prior to transmission;
   receiving, from the first obfuscation driver, third de-obfuscation instructions associated with the second obfuscated message; and
   de-obfuscating the second obfuscated message, including reordering the third plurality of message segments based on the third de-obfuscation instructions resulting in a second de-obfuscated message.

45. The method of claim 44, wherein establishing the first obfuscated communication session further comprises:
   receiving a request from the endpoint device to initiate the first obfuscated communication session, wherein the request includes a first encrypted unique machine identifier generated by the first obfuscation driver from the first unique machine identifier;
   decrypting the first encrypted unique machine identifier resulting in a second unique machine identifier;
   verifying that the second unique machine identifier matches the first unique machine identifier generated during the initialization of the first obfuscation driver;
   responsive to verifying that the second unique machine identifier matches the first unique machine identifier, generating a fifth obfuscation seed from the first unique machine identifier;
   sending a first handshake message including the fifth obfuscation seed to the first obfuscation driver;
   receiving from the first obfuscation driver a sixth obfuscation seed in a second handshake message;
   verifying an authenticity of the sixth obfuscation seed;
   responsive to verifying the authenticity of the sixth obfuscation seed, generating a seventh obfuscation seed from at least one of the fifth obfuscation seed and the sixth obfuscation seed;
   sending a third handshake message including the seventh obfuscation seed to the first obfuscation driver;
   receiving from the first obfuscation driver an eighth obfuscation seed in a fourth handshake message;
   verifying an authenticity of the eighth obfuscation seed; and
   sending a fifth handshake message including at least a ninth obfuscation seed to the first obfuscation driver, wherein the fifth handshake message acknowledges a successful initiation of the first obfuscated communication session.

46. The method of claim 44, further comprising:
   establishing a secure and obfuscated connection between the first obfuscation gateway and a second obfuscation gateway located across the first network from the first obfuscation gateway by:
      cross initializing the second obfuscation gateway with the first obfuscation gateway, wherein cross initializing includes collaboratively generating a second unique machine identifier of the second obfuscation gateway by the first obfuscation gateway and the second obfuscation gateway and collaboratively generating a third unique machine identifier of the first obfuscation gateway by the second obfuscation gateway and the first obfuscation gateway through a secure channel;
      generating a conjoined machine identifier from the second unique machine identifier and the third unique machine identifier;
      encrypting the conjoined machine identifier;

exchanging the conjoined machine identifier between the first obfuscation gateway and the second obfuscation gateway;

validating the conjoined machine identifier;

generating a first conjoined obfuscation seed of a plurality of conjoined obfuscation seeds from the conjoined machine identifier;

exchanging the first conjoined obfuscation seed between the obfuscation gateways; and generating and exchanging subsequent conjoined obfuscation seeds of the plurality of conjoined obfuscation seeds from at least one other conjoined obfuscation seed of the plurality of conjoined obfuscation seeds.

47. A computer-readable non-transitory storage medium storing executable instructions, which when executed by a computer system, cause the computer system to:

initialize a first obfuscation driver included in an endpoint device connected to a first network, wherein the first obfuscation driver is in one of two states, an uninitialized state and an initialized state, and the initialized state has an active mode and a passive mode, and wherein the first obfuscation driver is operating in the active mode while the endpoint device is connected to a first obfuscation gateway with a secure connection, and wherein initializing the first obfuscation driver includes collaboratively generating a first unique machine identifier of the endpoint device by the first obfuscation driver and the first obfuscation gateway over the secure connection;

establish a first obfuscated communication session between the first obfuscation driver operating in the active mode, and the first obfuscation gateway;

receive, by the first obfuscation gateway, from the first obfuscation driver, a first obfuscated message of the first obfuscated communication session, wherein the first obfuscated message includes a first obfuscation seed and a first message payload, the first obfuscated message is received from the first endpoint device over the first network, and the first obfuscated message is received as a first plurality of message segments, the first plurality of message segments being reordered prior to transmission;

receive, from the first obfuscation driver, first de-obfuscation instructions associated with the first obfuscated message;

de-obfuscate the first obfuscated message, including reordering the first plurality of message segments based on the first de-obfuscation instructions resulting in a first de-obfuscated message;

forward the first de-obfuscated message to an application;

receive, from the application, a first response message including a second message payload;

create second de-obfuscation instructions associated with the first response message;

generate a second obfuscation seed from at least part of the first obfuscation seed;

send the second obfuscation seed to the first obfuscation driver;

receive, from the first obfuscation driver, a third obfuscation seed;

obfuscate the first response message by reordering a second plurality of message segments of the first response message based on the second de-obfuscation instructions resulting in a first obfuscated response message;

send, to the first obfuscation driver, the second de-obfuscation instructions and the first obfuscated response message, wherein the third obfuscation seed is included in the first obfuscated response message;

receive, from the first obfuscation driver, a second obfuscated message of the first obfuscated communication session, wherein the second obfuscated message includes a fourth obfuscation seed and a third message payload, the second obfuscated message is received from the first endpoint device over the first network, and the second obfuscated message is received as a third plurality of message segments, the third plurality of message segments being reordered prior to transmission;

receive, from the first obfuscation driver, third de-obfuscation instructions associated with the second obfuscated message; and de-obfuscate the second obfuscated message, including reordering the third plurality of message segments based on the third de-obfuscation instructions resulting in a second de-obfuscated message.

48. The computer-readable non-transitory storage medium storing executable instructions of claim 47, wherein establishing the first obfuscated communication session further comprises:

receiving a request from the endpoint device to initiate the first obfuscated communication session, wherein the request includes a first encrypted unique machine identifier generated by the first obfuscation driver from the first unique machine identifier;

decrypting the first encrypted unique machine identifier resulting in a second unique machine identifier;

verifying that the second unique machine identifier matches the first unique machine identifier generated during the initialization of the first obfuscation driver;

responsive to verifying that the second unique machine identifier matches the first unique machine identifier, generating a fifth obfuscation seed from the first unique machine identifier;

sending a first handshake message including the fifth obfuscation seed to the first obfuscation driver;

receiving from the first obfuscation driver a sixth obfuscation seed in a second handshake message;

verifying an authenticity of the sixth obfuscation seed;

responsive to verifying the authenticity of the sixth obfuscation seed, generating a seventh obfuscation seed from at least one of the fifth obfuscation seed and the sixth obfuscation seed;

sending a third handshake message including the seventh obfuscation seed to the first obfuscation driver;

receiving from the first obfuscation driver an eighth obfuscation seed in a fourth handshake message;

verifying an authenticity of the eighth obfuscation seed; and sending a fifth handshake message including at least a ninth obfuscation seed to the first obfuscation driver, wherein the fifth handshake message acknowledges a successful initiation of the first obfuscated communication session.

49. The computer-readable non-transitory storage medium storing executable instructions of claim 47, further comprising:

establishing a secure and obfuscated connection between the first obfuscation gateway and a second obfuscation gateway located across the first network from the first obfuscation gateway by:

cross initializing the second obfuscation gateway with the first obfuscation gateway, wherein cross initializing includes collaboratively generating a second unique machine identifier of the second obfuscation gateway by the first obfuscation gateway and the second obfuscation gateway and collaboratively generating a third unique machine identifier of the first obfuscation gateway by the second obfuscation gateway and the first obfuscation gateway through a secure channel;

generating a conjoined machine identifier from the second unique machine identifier and the third unique machine identifier;

encrypting the conjoined machine identifier;

exchanging the conjoined machine identifier between the first obfuscation gateway and the second obfuscation gateway;

validating the conjoined machine identifier;

generating a first conjoined obfuscation seed of a plurality of conjoined obfuscation seeds from the conjoined machine identifier;

exchanging the first conjoined obfuscation seed between the obfuscation gateways; and generating and exchanging subsequent conjoined obfuscation seeds of the plurality of conjoined obfuscation seeds from at least one other conjoined obfuscation seed of the plurality of conjoined obfuscation seeds.

* * * * *

UNITED STATES PATENT AND TRADEMARK OFFICE
CERTIFICATE OF CORRECTION

PATENT NO. : 10,382,450 B2
APPLICATION NO. : 15/438176
DATED : August 13, 2019
INVENTOR(S) : Noel Shepard Stephens It is certified that error appears in the above-identified patent and that said Letters Patent is hereby corrected as shown below:

In the Specification

Column 5 Line 67: "obfuscation drier" should read "obfuscation driver".

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*